(12) United States Patent
Weiss et al.

(10) Patent No.: US 6,513,020 B1
(45) Date of Patent: Jan. 28, 2003

(54) PROXY ASSET DATA PROCESSOR

(75) Inventors: Allan N. Weiss, Needham, MA (US); Robert J. Shiller, New Haven, CT (US)

(73) Assignee: Macro Securities Research, LLC, Cambridge, MA (US)

( * ) Notice: Subject to any disclaimer, the term of this patent is extended or adjusted under 35 U.S.C. 154(b) by 0 days.

(21) Appl. No.: 09/408,103

(22) Filed: Sep. 29, 1999

Related U.S. Application Data

(63) Continuation of application No. 08/961,121, filed on Oct. 30, 1997.

(51) Int. Cl.[7] .......................... G06F 17/60; G06F 17/00
(52) U.S. Cl. ................................... 705/36; 705/35
(58) Field of Search ..................... 705/35, 36

(56) References Cited

U.S. PATENT DOCUMENTS

| | | | |
|---|---|---|---|
| 4,346,442 A | 8/1982 | Musmanno | 705/36 |
| 4,376,978 A | 3/1983 | Musmanno | 705/36 |
| 4,597,046 A | 6/1986 | Musmanno et al. | 705/36 |
| 4,674,044 A | 6/1987 | Kalmus et al. | 705/37 |
| 4,700,297 A | 10/1987 | Hagel, Sr. et al. | 705/30 |
| 4,774,663 A | 9/1988 | Musmanno et al. | 705/36 |
| 4,953,085 A | 8/1990 | Atkins | 705/36 |
| 5,083,782 A | 1/1992 | Nilssen | 705/35 |
| 5,126,936 A | 6/1992 | Champion et al. | 705/36 |
| 5,270,922 A | 12/1993 | Higgins | 705/37 |
| 5,297,032 A | 3/1994 | Trojan et al. | 705/37 |
| 5,671,363 A | 9/1997 | Cristofich et al. | 705/37 |
| 5,745,885 A | 4/1998 | Mottola et al. | 705/36 |
| 5,765,144 A | 6/1998 | Larche et al. | 705/38 |
| 5,781,654 A | 7/1998 | Carney | 302/137 |
| 5,802,501 A | 9/1998 | Graff | 705/36 |
| 5,806,048 A | 9/1998 | Kiron et al. | 705/36 |
| 5,809,484 A | 9/1998 | Mottola | 705/38 |
| 5,812,988 A | 9/1998 | Sandretto | 705/36 |
| 5,826,243 A | 10/1998 | Musmanno et al. | 705/35 |
| 5,890,141 A | 3/1999 | Carey et al. | 705/45 |
| 5,963,923 A | * 10/1999 | Garber | 705/37 |
| 6,249,775 B1 | * 6/2001 | Freeman et al. | 705/36 |

FOREIGN PATENT DOCUMENTS

WO     WO 98/13778    * 4/1998      G06F/17/60

OTHER PUBLICATIONS

Weisul, Kimberly, "Datel exposes best bids, offers on all stocks", Aug. 11, 1997, Investment Dealers's Digest, vol. 63, Issue 32, pp 10.*

Shiller, Robert J. and Weiss, Allan N., "Home Equity Insurance", National Bureau of Economic Research, Inc., Working Paper Series, Working Paper No. 4830 (Aug. 1994).

Schiller, Robert J., "Macro Markets: Creating Institutions for Managing Society's Largest Economic Risks", Oxford University Press, Oxford, (Clarendon Press 1993).

Case, Karl E., Shiller, Robert J., and Weiss Allan N., "Index–Based Futures and Options Markets in Real Estate", The Journal of Portfolio Management, pp. 83–92 (Winter 1993).

* cited by examiner

Primary Examiner—Eric W. Stamber
Assistant Examiner—James W. Myhre
(74) Attorney, Agent, or Firm—McDermott, Will & Emery

(57) ABSTRACT

A novel data processing system manages and implements a new form of security designated the "Proxy Asset". Proxy Assets provide sophisticated risk management capabilities without the complexities associated with other types of risk management investment vehicles. The Proxy Asset is made possible by the enhanced processing capabilities of the Proxy Asset data processor which creates, tracks, manages, and governs asset accounts for participating investors.

86 Claims, 13 Drawing Sheets

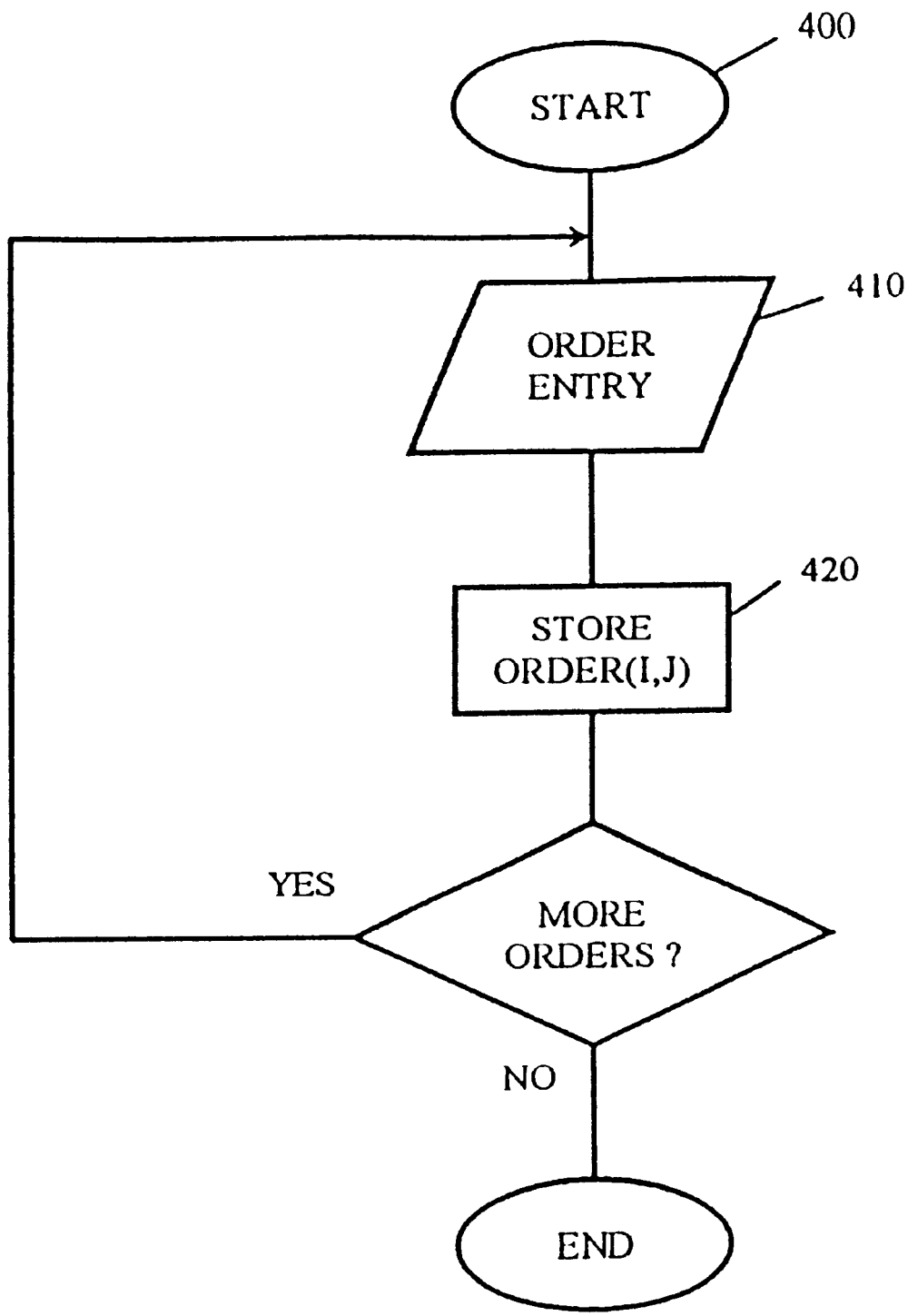
F I G. 7

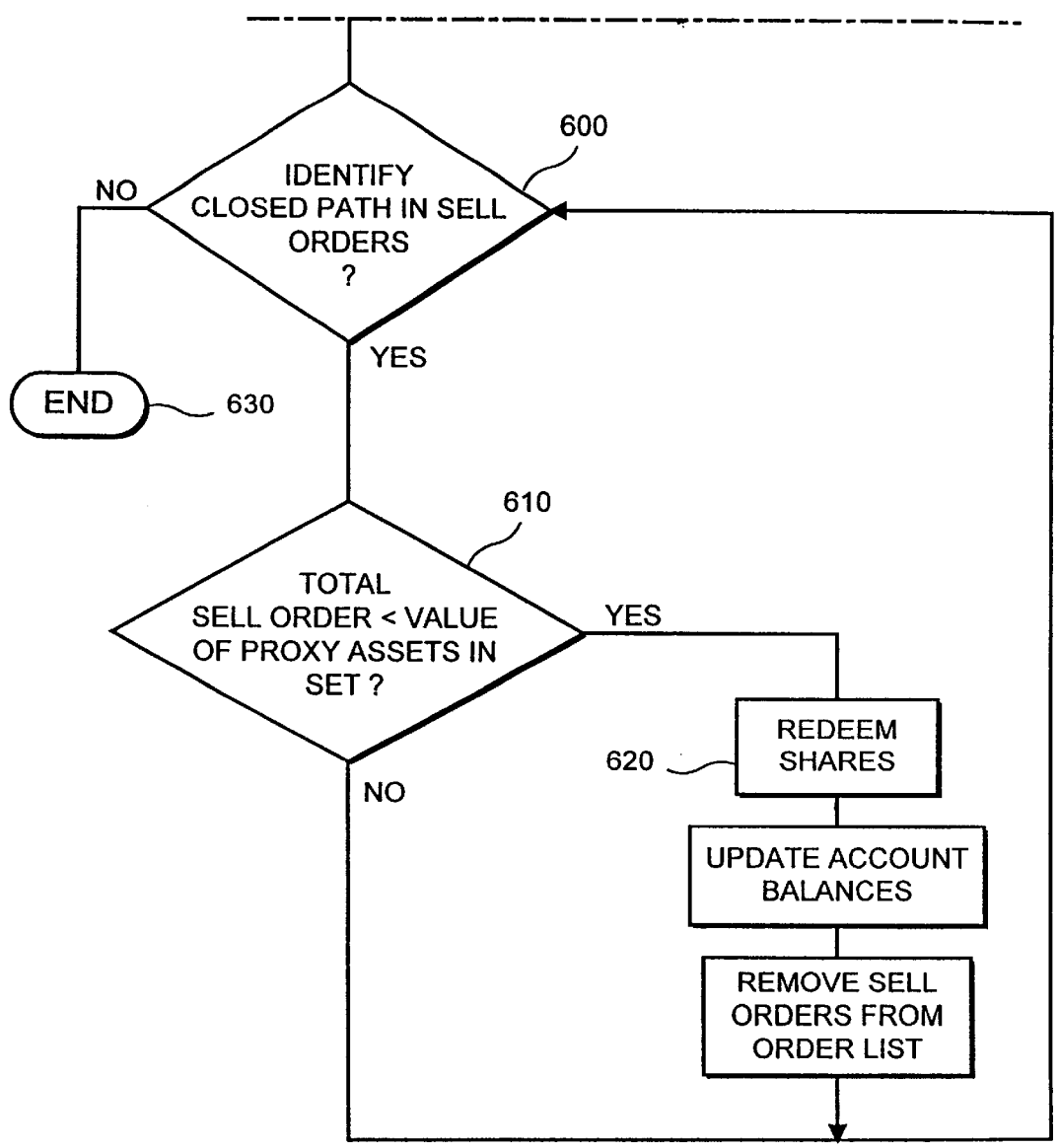
F I G. 8B

PROXY ASSET DATA PROCESSOR

This application is a continuation of application Ser. No. 08/961,121 filed Oct. 30, 1997.

FIELD OF INVENTION

The present invention generally relates to systems and integrated software for managing a novel Proxy Asset investment vehicle and the institutions necessary to implement the Proxy Assets. More particularly, the present invention provides the Proxy Asset Data Processor capable of creating, distributing, managing, and maintaining a plurality of Proxy Assets, linked to account activity in accordance with pre-determined criteria, and also executing trade, issuance and redemption of such Proxy Assets.

BACKGROUND OF INVENTION

A Proxy Asset is a new kind of security that is designed to make effectively tradable existing broad categories of illiquid assets or claims on income flows, assets or claims that are individually difficult or impossible to buy, hold, or sell directly. The Proxy Asset is designed to have a traded market price that reflects the true liquid-market value of the illiquid assets or claims. For example, Proxy Assets can be created that allow people to make investments in local real estate in a given city, and allowing owners of local real estate to hedge their exposure to real estate risk in that city, and also to allow them to see in the Proxy Asset share price an indicator of real estate prices in the city. For another example, Proxy Assets can be created to allow people to invest in claims today on shares of the flow of national income over future years of some country, or to allow people to hedge their own income risk, and also to see a market price of such a claim as never before. Thus, as used herein, the term Proxy Asset pertains to illiquid assets and to claims on income sources, such as human labor or human capital. For still other examples of illiquid assets that may be the basis of Proxy Assets, we mention privately held or infrequently traded corporate stocks, infrequently traded bonds, ships and aircraft, rare coins, precious gemstones, masterpiece paintings, livestock, and thoroughbreds. These assets, like real estate, are highly illiquid, and are difficult or impossible to hedge using traditional hedging mechanisms.

A Proxy Asset Data Processor is employed as part of a Proxy Asset Management System, and is designed for creating, distributing, managing, and maintaining the Proxy Assets. The new data processor makes possible this fundamentally new kind of asset by defining and managing the dividend flow of these assets, guaranteeing payment of the defined dividend by management of underlying cash-value accounts, and also facilitating trade, issuance and redemption of such Proxy Assets and thereby assuring certain adding-up constraints for market prices.

The Proxy Assets are configured to simplify their use, and understanding by investors; to parallel familiar existing assets in appearance and in terms of the kinds of contingencies and activities that the investors become involved with, and to offer the same feeling of financial soundness. The Proxy Asset Data Processor is designed to reinforce and confirm these impressions among investors, by facilitating the basic functions necessary for the Proxy Asset's essential equivalence with other assets.

Making otherwise illiquid assets liquid is extremely important. With illiquid markets, investors may be stuck with an inordinately risky exposure to some illiquid assets and at the same time unable to diversify their portfolio into other illiquid assets. For example, in the market for single family homes, people may be excessively exposed to single family home price risk in their own city, unable to hedge this risk by shorting their city, and unable to invest in single family homes in other cities.

Laws and regulations regarding securities trading are designed to make a clear distinction between securities and derivatives (such as futures and options), and between securities and short sales. Institutions that hold securities as part of their portfolios may be restricted by charter, pronouncement, or regulation from dealing freely in derivatives or from making short sales. These restrictions are designed to guarantee against certain abuses, such as taking excessively speculative positions. Individual investors, fearful of getting into an unexpectedly leveraged position or of being exposed to large or unlimited losses in certain circumstances, may have simple personal rules of thumb so that they will not buy unusual investment instruments. Our Proxy Assets are designed to resemble existing well-known types of securities, like ordinary stocks, so that these restrictions may have their intended effect.

That Proxy Assets resemble familiar securities may also have certain psychological benefits. First, people are somewhat afraid of investing in exotic derivatives because they have the feeling that the structure of the contract is too complicated and abstract, unlike the common law concept of property that has been fundamental to human society since prehistoric times. People tend to feel insecure about an investment whose payoff is determined by a complex contract or mathematical formula in contrast to a traded market price. Second, there are familiar institutions and practices associated with ownership of securities that are not duplicated with most derivatives. For example, the simple notion that an asset has both an enduring capital value and also generates an income at regular intervals and that one may have a rule of thumb allowing one to consume the income but not the capital value itself. Third, many derivatives can involve margin calls to which investors can react very negatively because they force investors to focus on their losses from individual portions of their portfolio, even when their overall portfolio is doing well. Thus, for example, investors who hedge against losses in holdings of an asset by taking a short positions in the futures markets can be very upset by the repeated margin calls that would be the consequence of such hedging should prices increase. They tend to feel upset by the margin calls even though their losses in the futures market are compensated since the value of the portfolio of other assets is increasing, since the former is made more psychologically salient by the need to take action. An individual who hedges risk by taking a position in a Proxy Asset whose price moves opposite that of the asset hedged will not be confronted by margin calls, can just forget about the portfolio, and thus may be psychologically in a frame of mind that better promotes hedging.

There have been over time, many different types of investment vehicles. Investment Trusts (REITs) which were designed by an act of the U.S. Congress in 1960 to allow large numbers of investors in real estate, are no more than tax-exempt portfolios of existing readily-made real estate investments. The real estate that they cover is limited to already readily investable classes, excluding for example owner-occupied homes. REITs are not flexible and thus cannot meet current hedging and investment needs.

There are a number of mortgage, reverse mortgage, or sale-of-remainder methods that individual homeowners can use to reduce risk to them due to price fluctuations in their home. Shared appreciation mortgages have a long (though limited) history. A variation on this is the housing limited partnership. Reverse mortgages are contracts in which a homeowner is able to obtain a lifetime annuity from the value of his or her home; these reverse mortgages may pass some of the price risk to the mortgage lender. Sale of remainder refers to a contract in which the homeowner may sell a share in the house to another party with a contract to remain living in the house.

Home equity insurance, discussed in Robert J. Shiller and Allan N. Weiss, "Home Equity Insurance," National Bureau of Economic Research Working Paper 1994, forthcoming, Journal of Real Estate Finance and Economics, incorporated herein by reference, is an insurance contract on an individual home that pays out if the price index for the region should fall sufficiently.

In 1994, Barclays de Zoete Wedd (BZW) started Property Index Certificates (PICs). These are bonds, with maturities of two, three, four, and five years, whose principal at maturity is tied to a commercial real estate price index. BZW owns companies like Canary Wharf and Imry as a result of bad property loans, and has issued the PICs as a way to insulate itself from further moves in commercial real estate prices. In November 1996, BZW also created what are essentially UK commercial real estate index settled futures, although there is no clearing house and BZW is always one side of the contract. An industry-wide group led by AMP Asset Management (the fund management component of Australia Mutual Provident), has been scheduled to start true index-settled UK commercial real estate futures markets in 1997.

There have been for some time ordinary puts and calls that are settled on indices, such as the Standard and Poor's Index Options. There have been certain swap arrangements that investment banks make between themselves and counter parties. Banks may make many such swap arrangements in such a way that the swaps cancel out, and the bank itself is bearing no risk.

The Standard and Poor Depositary Receipts (SPDRs, or, commonly, spiders) were created at the American Stock Exchange in 1993. Each SPDR is like a security, which is traded on the stock exchange, and behind it is an underlying basket of assets, representing the stocks used to compute the Standard and Poor Composite stock price average. Redemption and issuance rules enforce market price correspondence with the market price of the underlying portfolio. The assets held are the actual stocks themselves. Still, the SPDRs are used to create an asset that is like a stock and to insure that the market price corresponds at all times to the value of the basket of stocks. The "superunits" and the "supershares" created at the AMEX somewhat earlier also shared this property.

Certain computerized trading systems, such as that used at the Iowa Experimental Markets at the University of Iowa have been used in the past. For example, in their presidential election trading system, a security is created for every presidential candidate, and it pays $1 if that person is elected president. Since only one person can be elected president, the trading system can automatically create new securities whenever buy orders for all presidential candidates come in with combined offer prices equal to $1.

See also, "A Goal-Directed Financial Asset Management System" invented by Robert R. Champion and Basil R. Twist Jr., awarded U.S. Pat. No. 5,126,936 on Jun. 30, 1992, and a System for the Operation of a Financial Account invented by Charles A. Atkins and Amelia Island, and awarded U.S. Pat. No. 4,953,085 on Aug. 28, 1990.

Accordingly, none of the prior art satisfies the objectives of the present invention, and none shows the basic features of the invention as described hereinbelow. More background information can be found in the following references, the contents of which are incorporated by reference.

Karl E. Case, Robert J. Shiller, and Allan N. Weiss, "Index-Based Futures and Options Trading in Real Estate," with Karl E. Case and Allan N. Weiss, *Journal of Portfolio Management*, Winter 1993.

Robert J. Shiller, Macro Markets: Creating Institutions for Managing Society's Largest Economic Risks, Oxford University Press, Oxford England, (Clarendon Series) 1993.

Robert J. Shiller and Allan N. Weiss, "Home Equity Insurance," National Bureau of Economics Working Paper, 1994.

OBJECTS AND SUMMARY OF THE INVENTION

It is, therefore, an object of the present invention to provide a Proxy Asset Management System and Processor for creating, distributing, and managing Proxy Assets.

It is another object of the present invention to provide a data processing system that operates to define dividends on the Proxy Assets to their holders in accordance with stored programmed criteria that characterize the Proxy Asset's market price so that it will approximate the price of the intended underlying asset.

It is another object of the present invention to provide a data processing system for conveying information about underlying values and prices to the publics so that the cash value information is distributed in essentially real time.

It is another object of the present invention to provide a data processing method and system to execute trades in the Proxy Assets, so that the exchange of existing Proxy Assets, the redemption of existing Proxy Assets and the issuance of new Proxy Assets can be seamlessly handled, automatically and efficiently, so that all traders are assured of the best possible price at all times and so that adding-up constraints of prices with underlying asset value are always reflected in market prices. The "Adding-up Constraint" insures that the total market prices of all the Proxy Assets in a Complete Set under system management equals the investments held by all such Proxy Assets combined.

The above and other objects of the present invention are realized in a Proxy Asset System including a Proxy Asset Data Processor with linked database for managing a plurality of Proxy Asset accounts. Investors become holders of claims (herein termed "shares") in one or more Proxy Assets that have an underlying value by virtue of the Proxy Asset's linkage to a Cash Account. The Proxy Asset Cash Account balance is periodically adjusted in accord with changes in the value of the associated illiquid asset or level of income from an income source, the pooled Cash Account balances managed by an investment manager or Bank. The system uses indices of the market value or of income at set intervals, and employs these indices as a vehicle for determining the balances in the Cash Accounts, which in turn will affect the price and payouts (herein termed "dividends") on the Proxy Asset. The database includes detailed account information and stores the updated account balances on a periodic basis as controlled by the processing logic. At set intervals, the system adjusts the Cash Account corresponding to each Proxy Asset by transfers between Cash Accounts in accordance with a formula associated with each Proxy Asset. The new balance controls the scale of the dividend paid on the Proxy Asset, rewarding through time those Proxy Assets tied to formulas that increase as determined by the indices. The Proxy Assets are exchanged in the market either via conventional brokerage services or directly through a trading system defined here, allowing a broad spectrum of investors access to this investment and risk management vehicle.

In accordance with the varying features of the present invention, the Proxy Asset System further includes processing logic to permit selective bundling of Proxy Assets into Proxy Asset portfolios or Proxy Asset Bundles. These Proxy Asset Bundles are configured to permit enhanced distribution in response to changing investment and hedging demands for the underlying illiquid assets. Account features include the subsequent dispersion of the pools into their individual Proxy Assets. Accounts are linked to traditional markets to permit trading and exchanging of Proxy Assets by means akin to those techniques now employed to trade stocks and bonds.

The foregoing features are best understood by review of the following detailed description of an illustrative data processing system constructed in accordance with the present invention, including drawings of the illustrative embodiment of which:

BRIEF DESCRIPTION OF THE FIGURES AND TABLES

Figure 3:
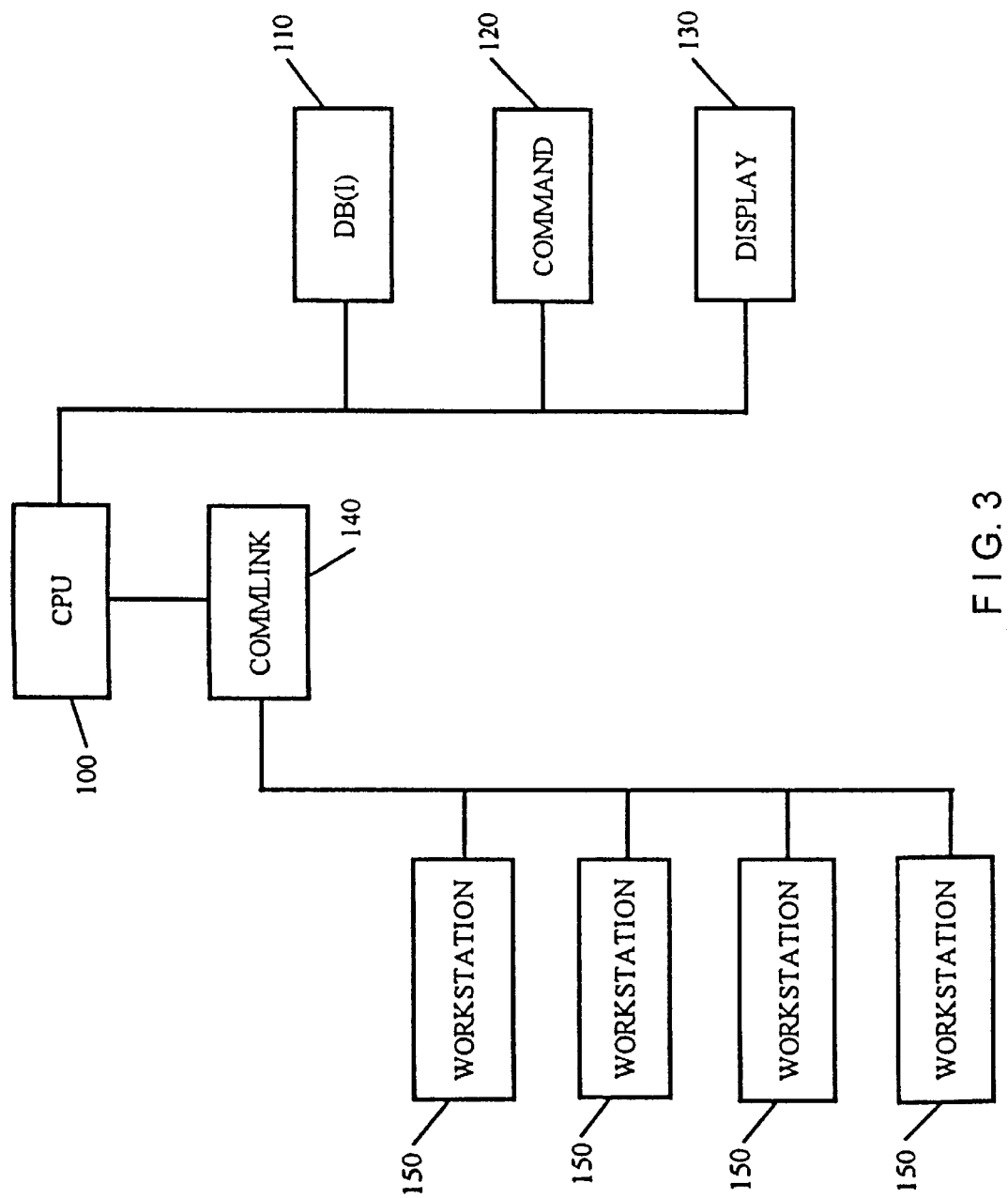
Figure 4A:
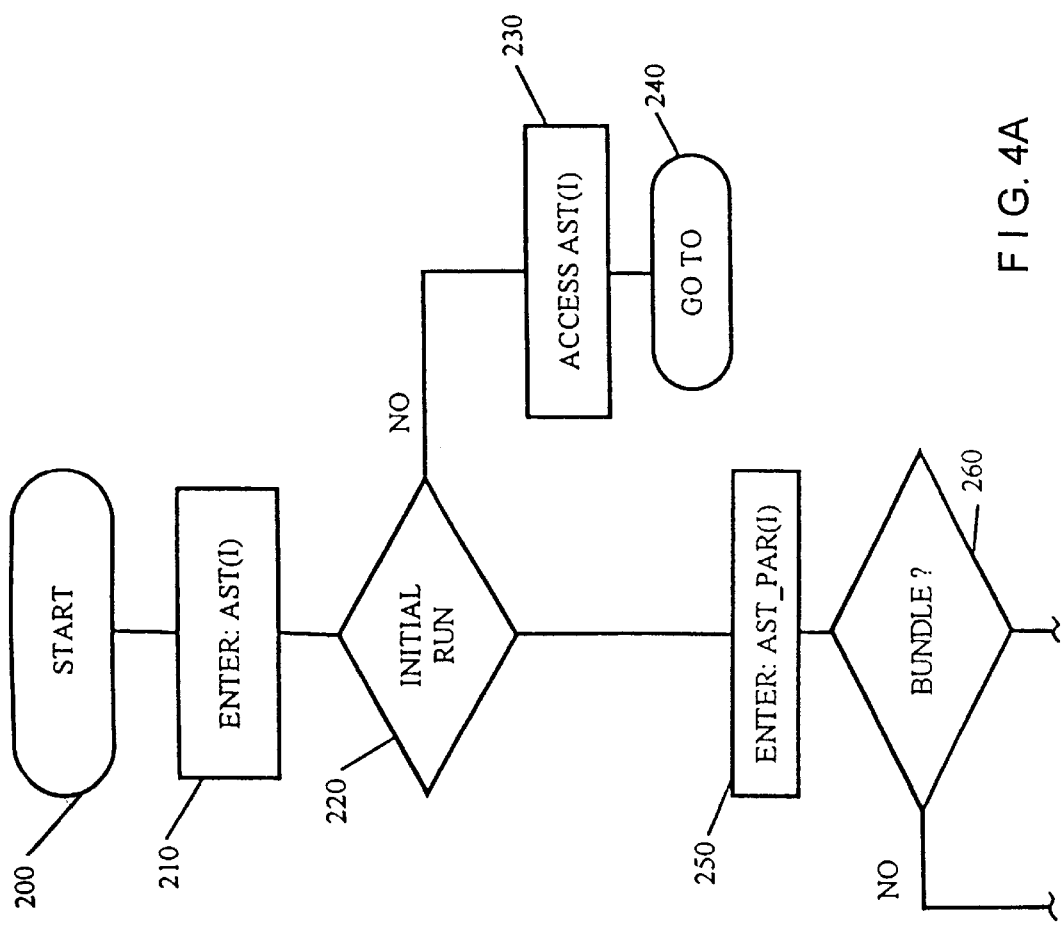
Figure 4B:
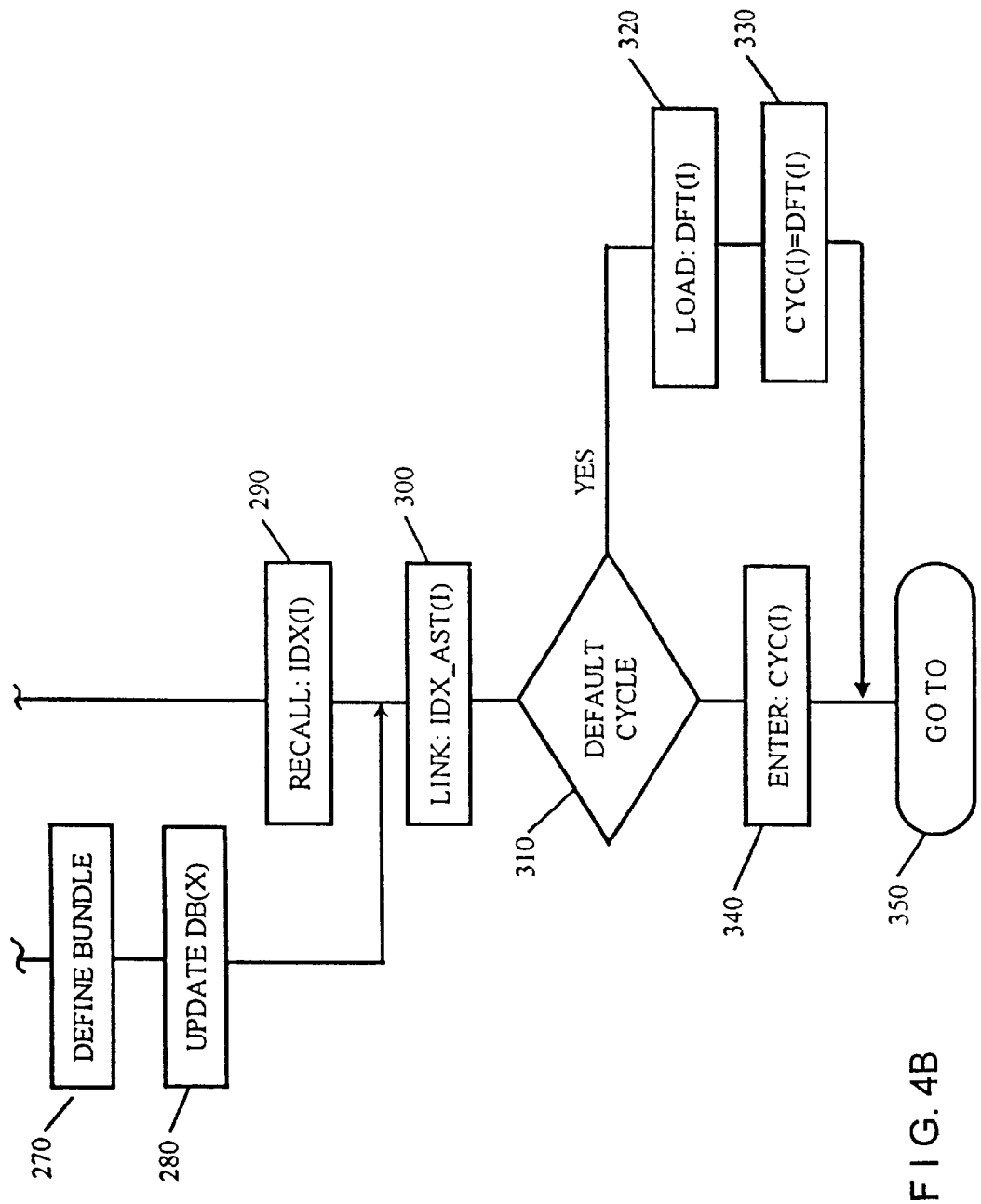
Figure 5A:
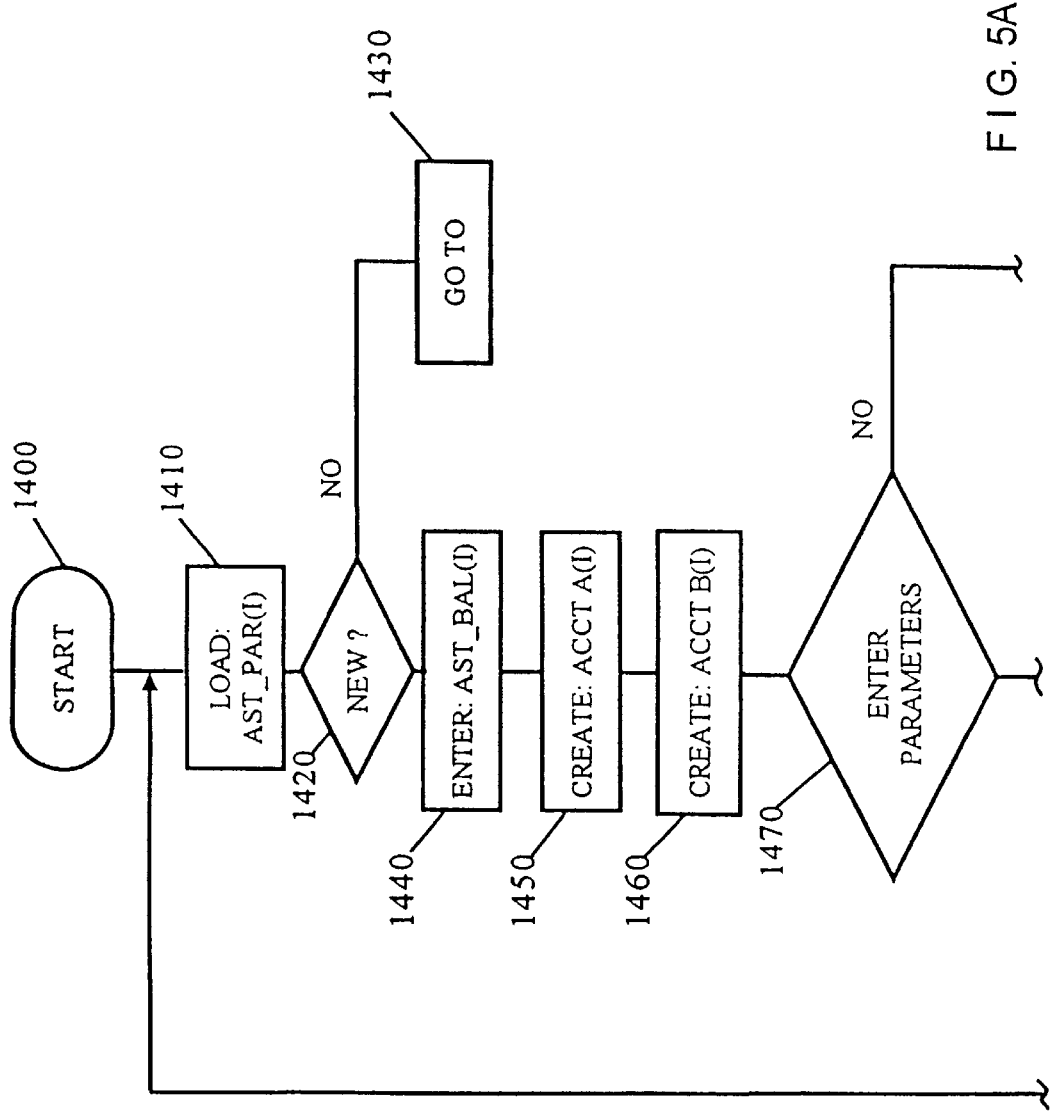
Figure 5B:
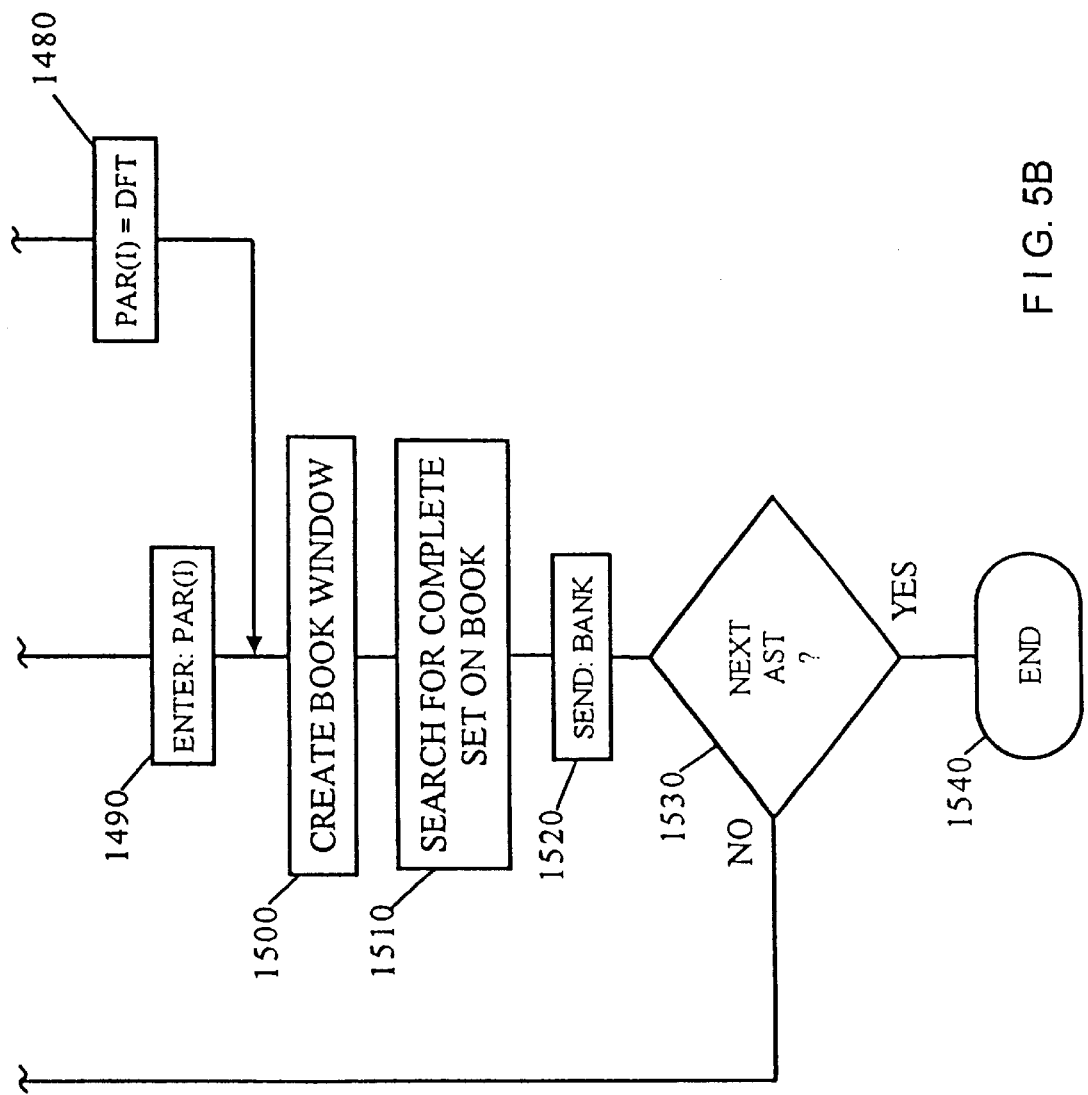
Figure 6A:
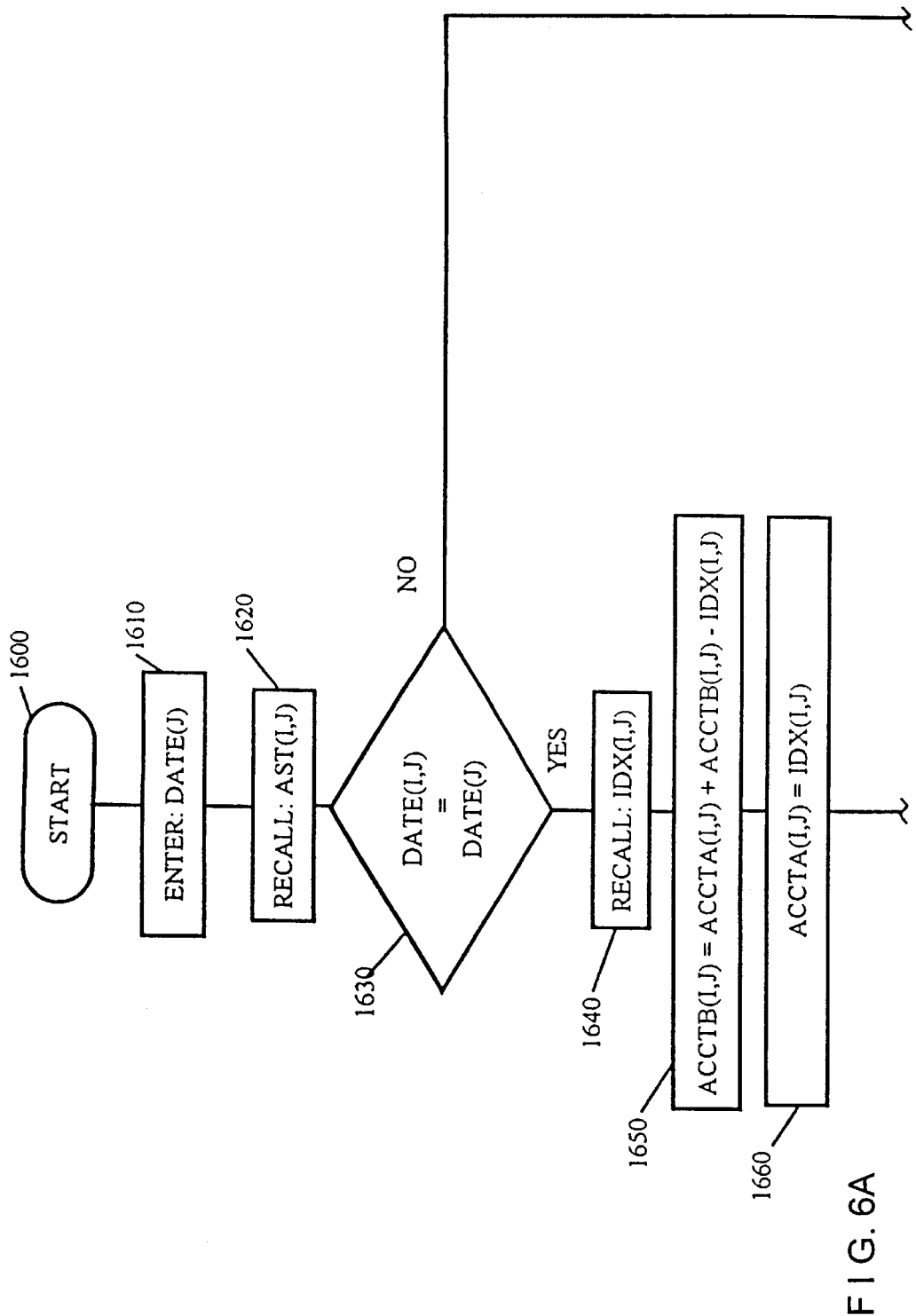
Figure 6B:
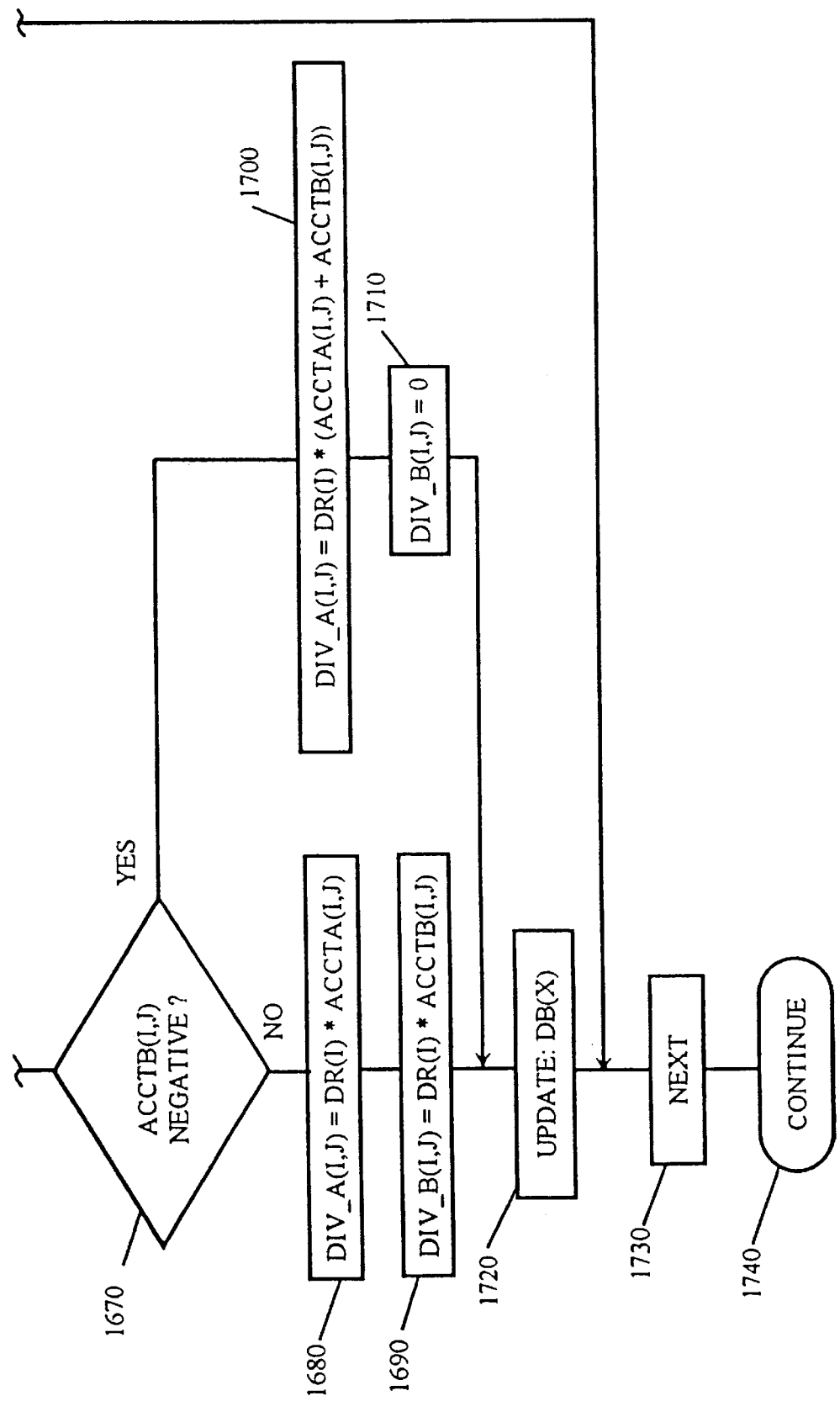
Figure 8A:
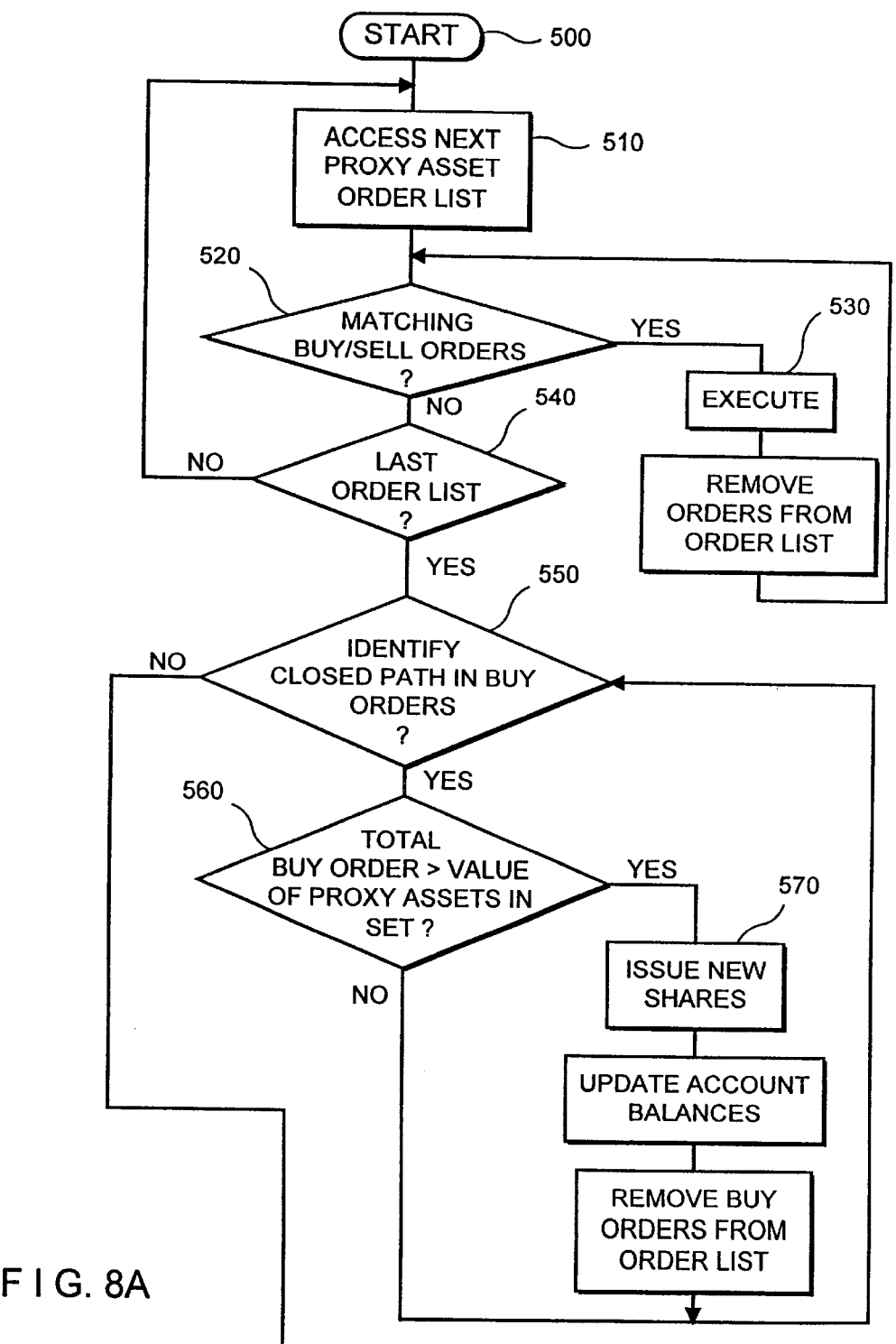
Figure 9:
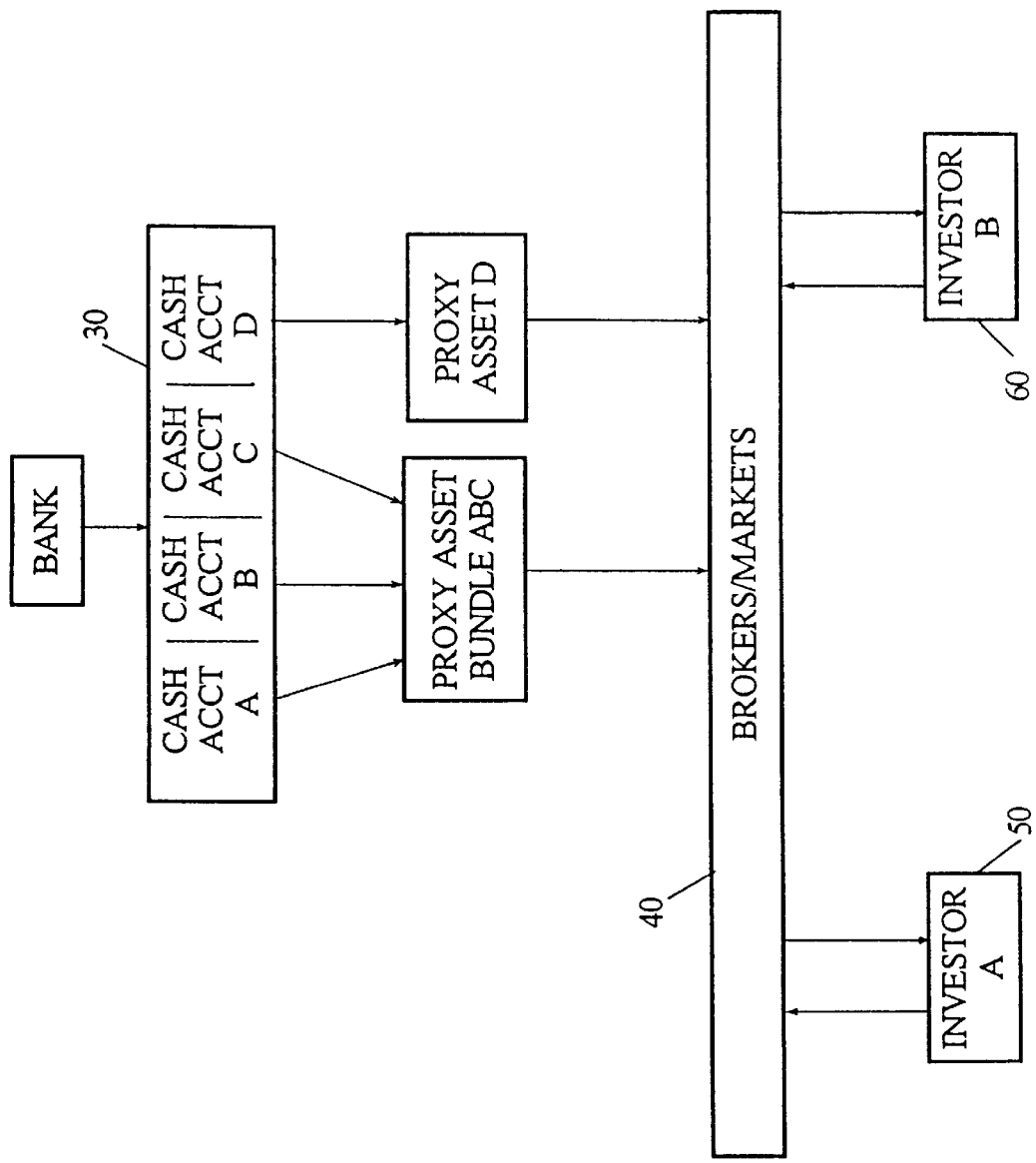

FIG. 3 provides a functional block diagram of the computer hardware available to practice the invention;

FIG. 4 provides a logic flow diagram for the Proxy Asset Generator;

FIG. 5 provides a logic flow diagram for the Account Manager;

FIG. 6 provides a logic flow diagram for the Dividend Generator;

FIG. 7 is a logic flow chart depicting the Proxy Asset Order Processor;

FIG. 8 is a logic flow chart illustrating an embodiment of the Proxy Asset Trading, Issuance and Redemption System; and FIG. 9 is a relational block diagram depicting the Proxy Asset Bundle Manager.

DETAILED DESCRIPTION OF THE INVENTION

First, briefly in overview., the present invention is directed to a novel Proxy Asset System operated by a System Proprietor responsible for implementing and managing a group of Proxy Assets. The System Proprietor is linked to various ancillary information sources and outlets, via communications links including dedicated server lines, the internet, or similar. Thus, the system is accessible to brokers or outside investors, in a limited and pre-defined way.

The Proxy Asset System is implemented by a Proxy Asset Data Processor and a programmed controlled criterion for operation, with this criterion well understood by participants. The Proxy Asset Data Processor includes a Proxy Asset Account Manager and a Proxy Asset Dividend Generator. In addition, the Proxy Asset System preferably includes a Trading, Issuance and Redemption System that receives and stores customer orders to buy and sell, including market orders, limit orders and possibly other varieties of order, and executes these orders by trading existing Proxy Asset shares or issuing or redeeming Proxy Asset shares in Complete Sets, here defined, as needed. The stored programming implements a Cash Account Formula, that defines the balances in the Cash Accounts and a Dividend Payout Formula for each Proxy Asset, to be discussed here below. The pooled resources for all Cash Accounts within the system are invested in some assets, such as money market instruments, by an investment manager, or separate firm external to the system, characterized herein as the Bank. The Bank reports to the System Proprietor the value of the pooled resources, and the System Proprietor tracks the separate Cash Accounts for the Proxy Assets, which are claims on the pooled funds in the Bank. The underlying criteria for account processing are publically distributed to insure complete knowledge by participants. Transfers are made among cash accounts within the Proxy Asset System. The illustrative examples here present a single Proxy Asset System, recognizing that there could be more than one such system, each operating at different institutions run by different System Proprietors.

Turning to an exemplary Proxy Asset System implementing, at a minimum, two Proxy Assets for real estate in a given city for a given base year. These two Proxy Assets are referred to as an Up Proxy Asset and a Down Proxy Asset, one share of each forming what will be called a Complete Set (see also below). The first Proxy Asset, the Up Proxy Asset, has a Cash Account balance per share that is adjusted by the System Proprietor according to a Cash Account Formula that specifies that it contains, at regular intervals (e.g., quarterly), a balance proportional to the real estate price index for the given base year for that city, and investors ("shareholders") in that Proxy Asset receive a regular Dividend according to a Dividend Payout Formula that specifies a dividend payout equal to a constant, predetermined, payout rate times the balance in the Cash Account corresponding to that share and subject to an upper limit. The second Proxy Asset, the Down Proxy Asset has Cash Account balance per share that is set, according to its Cash Account Formula, to equal the combined balances in the Cash Accounts for both Up and Down Proxy Asset per share minus the balance in the Up Proxy Asset Cash Account per share. Its Dividend Payout Formula defines a dividend equal to the payout rate times the balance in that account, so long as that balance is positive, and not exceeding an upper bound. The system is defined so that all dividends payouts are always feasible: the sum of the Dividend Payout Formulas for an up share and a down share is always less than the combined balances per share in the two accounts in the Bank, by construction.

Accordingly, buying shares in the Up Proxy Asset corresponds to investing in the illiquid real estate itself; the Proxy Asset is, however, liquid. Moreover, shares in the Up Proxy Asset have the look and feel of an ordinary investment, since they confer on the investor a claim on the Cash Account which "backs" the Proxy Asset, thereby encouraging a receptive market psychology for these assets. Investments in the Down Proxy Asset are less clearly analogous to existing investments. One might call a share in one of them analogous to a portfolio consisting of a short position in real estate and also the margin account balance for that short position. By this interpretation, if the assets are created when the index is at 100, we may say that the margin account has an initial margin of 200%, rather than the 150% required by the Federal Reserve regulations for conventional short positions, the higher initial margin allowing for a reasonably well-functioning hedging vehicle without margin calls. If the index drifts far from 100, then the Proxy Asset System creates new Up and Down Proxy Assets with an index that is 100 in a newer base year, issuing both Up and Down Proxy Assets at 100. Investors may then redeem their original Proxy Assets and purchase those with the newer base year. Since the Down Proxy Asset does not involve margin calls at all and resembles an asset, it is better to regard it as a fundamentally new investment vehicle that makes it much easier for participants to hedge their risks.

In accordance with pre-defined logic and controlling system instructions, the System Proprietor has two primary functions. The first is to create the Proxy Assets and distribute shares in these assets, like the Up-Down Proxy Assets described in the example above, in a way that allows free commercial access and payment of a market price for the Proxy Assets, and to allow redemption of shares. The second aspect involves, as seen in the example above, the management of a Cash Account for each Proxy Asset that is linked to the Cash Accounts of other Proxy Assets in the system and so that the changes in the value of the underlying assets are translated into changes in Cash Account balances and ultimately into dividends for distribution to the owners of the Proxy Asset shares. A third function, a Trading, Issuance and Redemption System, is optionally integrated as a feature of the System.

As in the example above, each Proxy Asset within the Proxy Asset System has a prespecified Cash Account Formula that defines how much is in its Cash Account per share at each point of time. Those Proxy Assets whose Cash Account Formulas sum identically to the combined cash values per share in the Cash Accounts corresponding to all the Proxy Assets in the set will be called a Complete Set of Proxy Assets. As long as all Proxy Assets are part of Complete Sets of Proxy Assets, then it is always possible for all Proxy Assets to be created such that the Proxy Asset Data Processor can always adhere to the Cash Account Formulas defining the Proxy Assets's balances without running out of cash. (There may also be restrictions on the kinds of Complete Sets for which share redemptions or new share issues will be generated.) Proxy Assets will be issued and redeemed by the Proxy Asset Data Processor only in Complete Sets, so that the Cash Account balances defined by the Cash Account Formula and the dividends can always be paid in accordance with the Cash Account Formula.

We can clarify what we have said above about issuance and redemption in mathematical terms. Let us call $V_t$ the total value of all pooled Cash Accounts for a given base year in the Bank at time t. Call $S_t$ the number of shares of all Proxy Assets in the system. Thus, the value per share, averaging over the entire system with that base year is $V_t/S_t$, though individual Proxy Assets within the system will have different values. The Proxy Asset Data Processor allows free issuance of new shares and redemption of existing shares at any time t at prices so as not to disturb $V_t/S_t$. Thus, when a packet of new shares is issued at time t, if there are $s_t$ shares in the packet, the total value of the packet must be $V_t s_t/S_t$, so that after issuance there will be $S_t+s_t$ shares and the total value after the issuance will be $V_t+V_t s_t/S_t$. It follows that the value per share after issuance will be $(V_t+V_t s_t/S_t)/(S_t+s_t)$ which equals $V_t/S_t$, the same as it was before the issuance. Note that in general the individual shares will not be issued or redeemed at price $V_t/S_t$, nor will the underlying cash value accounts for each share contain that amount.

The Cash Account Formula for each Proxy Asset specifies how much its Cash Account contains per share, at regular intervals such as quarterly, in terms of some measure of value or income of underlying Proxy Assets, as well as in terms of $V_t/S_t$, and possibly other economic variables such as inflation or interest rates.

A Complete Set is a set of n shares of Proxy Assets such that the sum of Cash Account Formulas for the Cash Accounts per share equals $nV_t/S_t$. Thus, so long as the shares comprise a Complete Set according to the formula definitions, they can be issued or redeemed together without affecting $V_t/S_t$.

The Dividend Payout Formula for each Proxy Asset specifies how much is paid out as a dividend per share each time period to owners of that Proxy Asset as a function of the balance in that Proxy Asset's Cash Account per share, and possibly as a function of other data, such as interest rates and the rate of inflation, and possibly as a function of the balances in Cash Accounts that belong to the same Complete Set. The Dividend Payout Formula must be specified so that dividend payments are always feasible given the balances in the Cash Accounts.

There is an important reason for issuing and redeeming shares only in such a way that the value per share, averaging over the entire system, is unaffected. The reason is that the Cash Account balances of individuals will thus be protected from being influenced by the decisions of other investors to issue or redeem.

The Cash Account for each Proxy Asset has several purposes. First, all Proxy Asset holders receive dividends equal to the amounts in their asset value account at the dividend definition date times a payout factor defined by the Dividend Payout Formula, generally, the same payout factor applied to all Proxy Assets managed by a single Proxy Asset System. Second, the account balance is used by the system to determine whether offers to buy or sell can be settled by issuance of new Proxy Assets or redemption of old Proxy Assets. Third, the account balance is provided to customers as information relevant to their evaluation of the Proxy Assets; the Cash Account balance may be referred to as the cash value of the investment, and thus lends substance to the otherwise amorphous securities.

Two illustrative techniques depict the issuance and redemption of Proxy Assets. The first technique involves issuing Complete Sets of Proxy Assets to brokers by conventional underwriting methods, just as new shares in corporations are issued today. Brokers who buy the Complete Sets will then have the burden of selling off the elements of the Complete Sets to clients as best they can, leaving the problem of finding customers for the elements of the Complete Sets to the brokers. Moreover, brokers can redeem the Complete Sets of Proxy Assets by purchasing on the market the Complete Sets, and submitting these back to the System Proprietor.

The second technique provides for an integrated Trading, Issuance, and Redemption System implemented by the System Proprietor, (possibly with the participation of an existing electronic trading system) that solves the problem of finding Complete Sets for the brokers, and also allows trading of existing shares. If the Proxy Asset shares are traded on the trading system described here, participants in the system, (e.g., brokers and possibly individuals), can place orders to buy or sell Proxy Assets in the form of either a market order (to buy or sell at any price) or a limit order (to buy at a price at or below a given price or to sell at a price at or above a given price), and possibly other kinds of orders. The system will manage the buy or sell orders partly as do other existing trading systems today: in the case of limit orders, it will search for matches, sell limit orders that are at or below buy limit orders for single Proxy Assets, and clear them. It will also execute buy or sell orders in another way. Whenever a set of unmatched buy orders can be found that constitutes a Complete Set of Proxy Assets, at combined prices equal to or above the combined values of the Cash Accounts of the Proxy Assets, then the orders will be executed by creating a new Complete Set of Proxy Assets and crediting the proceeds of the sale (minus some commission) into the Cash Accounts in amounts corresponding to the balances currently in the accounts. Whenever a set of sell orders can be found that constitutes a Complete Set of Proxy Assets, at combined prices at or below the combined values of the Cash Accounts of the Proxy Assets, then the orders will be executed by redeeming a Complete Set of Proxy Assets, and transferring the balances (minus some commission) in the Cash Accounts in amounts corresponding to the balances currently in the accounts to the sellers. When such Complete Sets are discovered among buy or sell orders, it means that it is feasible to execute the order by issuance and/or redemption without having any effect on the System Proprietors' ability to keep asset balances at their values specified by the Cash Account Formula, and the execution will then be done automatically. The Trading, Issuance, and Redemption System is preferably fully automated and electronic, though it is possible that elements of the system may need to be done manually, given possible regulatory or other issues. Please see U.S. Pat. No. 4,674,044 to Kalmus, et al., relating to automated trading techniques, the contents of which are incorporated by reference.

It is possible in some implementations of the Trading, Issuance, and Redemption System that the System Proprietor is not the only exchange, or even the primary exchange, on which the existing Proxy Assets are traded. Trades on the system may be limited to issuance and redemption, or limited to certain times, such as once a month. System constraints will reflect federal and state regulations, taxation issues, and issues raised by existing securities exchanges.

A separate aspect involves the creation of Proxy Asset Bundles, groupings of Proxy Assets that may be traded as a bundle even if the individual components do not trade individually. Under this approach, the system implements the dismantling of the Proxy Asset bundles under select circumstances. The bundling and dismantling will be illustrated below.

EXAMPLE I

Up-Down Proxy Assets

Applying the above structure to a real estate example, two Proxy Assets are established for each city (and associated base year) to be managed by the system: one (the Up Proxy Asset for a long position in real estate in that city, and the other (the Down Proxy Asset) for a short, or reciprocal position, in the city. We shall suppose that when the Proxy Assets for this base year were first issued in that base year, the home price index was scaled so that the index equaled 100 then, and the initial Cash Accounts for both the Up Proxy Asset and the Down Proxy Assets originally contained $100. The Cash Account Formula for the Up Proxy Asset at quarterly intervals after that is just the price index:

Up Cash Account balance per share end of quarter=home price index. The Cash Account Formula for the Down Proxy Asset Cash Account balance per share, that determines its Cash Account balance at time t, is:

Down Cash Account balance per share end of quarter=2×total account balances per share—home price index.

(In terms of the mathematics shown above, the Up Proxy Asset Cash Account balance at the end of quarter t equals the home price index at time t, $I_t$, and the Down Proxy Asset Cash Account balance equals $2V_t/S_t-I_t$.) Transfers between the accounts are made each quarter to assure that at the end of each quarter these Cash Account Formulas are satisfied. Thus, if the index is 100 in the base year and is now 120, (reflecting an increase in real estate prices since the base year) then the underlying account for each up security has $120 in it. The Cash Account balance for one share of the down security is just the combined investment value of the balances in a pair of up and down securities in that city minus the index. The combined investment value in the Up and Down Cash Accounts was $200 on the base date, when the index was 100 by definition, and today is the accumulated investment value (in the money market find where Cash Account balances are invested) since the base date of $200, after paying out dividends according to the Dividend Payout Formula. Thus, for example, if the combined value in the Up and the Down Cash Accounts per share is now $205, then when the index is at 120, the down account has $85 corresponding to each down security.

To support issuance-redemption and trade execution, the Proxy Asset Data Processor searches over the buy and sell orders to find a Complete Set whose total prices exceed the total value of a set. Since a Complete Set consists of one Up Proxy Asset share and one Down Proxy Asset share, then whenever an offer to buy an Up Proxy Asset share at price $P_1$ and a Down Proxy Asset share at price $P_2$ are found such that $P_1+P_2 \geq 2V_t/S_t$, then both orders are executed and from the proceeds of the combined sale the Proxy Asset Data Processor allocates an amount equal to the value corresponding to one share in the Up Cash Account to that account, and an amount equal to the value corresponding to one share in the Down Cash Account to that account. Thus, after this issuance of new shares, each share has the same Cash Account balance as before, and there are now more shares outstanding. When offers to sell the shares are found at prices such that $P_1+P_2 \leq 2V/S_t$, then the shares are redeemed and the proceeds of the sale deducted from the Cash Accounts in proportion to the amounts already in these accounts. Moreover, when an offer to buy one Up Proxy Asset share at price $P_1$ and an offer to sell one Up Proxy Asset share at price $P_2$ is found by the Proxy Asset Data Processor so that $P_1 \geq P_2$, then the order is executed without issuance or redemption, merely by selling an existing share. The same occurs for offers to buy and sell Down Proxy Assets. In the above examples, we have neglected, for illustrative purposes only, the commission charged for the sales and also the profit accruing from these trades.

The Dividend Payout Formula for both Up and Down Proxy Assets in this example is given by:

Dividend per share=$r$×(amount in own Cash Account per share) if positive and if amount in own Cash Account is less than the combined value in the two accounts=0 if Cash Account is negative=$r$×(combined amount in the two accounts) if amount in own Cash Account is greater than the combined value where r is a payout rate defined by the Proxy Asset System rules; it could be a fixed number such as 2% per annum, corresponding to an estimate of the long-term real interest rate on money market accounts. (It must of course be less than 100% so that the dividend payout is always feasible, but presumably it will be much less.) The Down Proxy Asset's Cash Account could have a negative value in it, in which case no dividend will be paid to its shareholders. In this case, the Up Proxy Asset's Cash Account would have more than the total cash in the two accounts, in which case the dividend paid for the Up Proxy Asset per share would just be the payout rate, r, times the total cash in the two accounts per share. The market price of the Down Proxy Asset will still be positive, since there is always the possibility that the index will drop enough to bring its balance to a positive number again.

Note that the market price of the Up Proxy Asset will tend to the index, so long as the index does not differ too far from 100. In this case, investing in the Up Proxy Asset will be a proxy for investing in the real estate itself. So long as the unobserved dividends (in the form of housing services) on the actual real estate are approximated by the Dividend Payout Formula payout rate, then the owner of the Proxy Asset will be receiving the same dividends as would be received by investing in the real estate itself. So long as the Proxy Asset price stays close to the price index for the real estate, then investing in the Proxy Asset will also tend to produce essentially the same capital gains and losses as investing in real estate. However, investing in the Proxy Asset will not produce the identical capital gains and losses because the Proxy Asset market will be more liquid, allowing investors to take better opportunity of predictable movements in index values.

The Down Proxy Asset will be extremely useful to homeowners wishing to hedge the risks of their investment in their own home. As is well known, many recent declines in real estate markets have caused homeowners to lose the real equity in their homes. A single decision of a homeowner to put part of his or her investments in a Down Proxy Asset for the city will then effectively hedge the homeowner indefinitely against such price risk. Because the Down Proxy Asset has such a simple form, and is easily understood, it is easy for people to do this.

The system will provide continuous information about the balance in the Cash Account, and thus investors will have the satisfaction of knowing that their accounts are "backed" by some real assets. They will also know that if certain predefined circumstances pertain (such as termination of the system), they will automatically receive the balance in their Cash Account, further strengthening their impression that their investment has substantive value, even though such circumstances are so defined as to be unlikely for the foreseeable future.

Bundling is applied to our Up-Down Proxy Assets to facilitate the marketing of the assets. For example it is possible that in each city there is a demand for the down asset for that city, corresponding to the natural hedging demand for people of that city, but little or no demand for the individual up assets of individual cities, as investors all want to be diversified. The system creates and market down assets for each of the cities, but the corresponding Up Proxy Assets for each city is bundled for distribution as a single global Up Proxy Asset which is a portfolio of the Up Proxy Assets for all cities. These up assets could then later be taken apart, under defined circumstances.

The initial Down Proxy Assets could also be for individual zip codes or even census tracts, thereby facilitating very accurate hedging for individual homeowners, and the Up Proxy Assets marketed could be only highly aggregated as of the corresponding individual Up Proxy Assets.

EXAMPLE II

Swap Proxy Assets

A second form of Proxy Asset, continuing the real estate example, is labeled here Swap Proxy Assets. Investors wishing to swap out of the risk in their own city can buy an asset that is short their own city and long some other city. With such assets, they cannot adjust their overall real estate exposure (as they could with Up-Down Proxy Assets) but they can diversify their real estate exposure across cities (horizontal hedging). Adjusting the exposure to their own city can be a useful portfolio management device, since many investors are not overinvested in real estate per se but are overexposed to real estate in one region. With between-city-swap Proxy Assets, this kind of hedging of one's risk and diversification into other cities can have the appearance of buying ordinary shares in other cities. Buying the Proxy Asset is like buying a share in the other city and selling exposure in a first city.

If we begin the system for N cities, then there are N2−N ordered pairs of cities, and there will be one Swap Proxy Asset for each such pair. For the ijth pair, then the Cash Account Formula for the Cash Account for one share of Swap Proxy Asset ij is:

Cash Account Balance per share for Swap Proxy Asset $ij$=Average Cash Account Value per share+2*(Index$_i$−Index$_j$)

and we will have for the jith pair a Swap Proxy Asset whose Cash Account Formula is:

Cash Account Balance per share for Swap Proxy Asset $ij$=Average Cash Account Value per share+2*(Index$_j$−Index$_i$)

Note that the average Cash Account Value per share is the total balance in all Cash Accounts in the System per share, denoted $V_t/S_t$ above. In this example the Swap Proxy Assets are more levered than in the previous Up-Down example, in that the indices are multiplied by two. (Another multiplier, other than two, could of course be used, to create a different amount of leverage; the number given is just for illustration.) The prices of the Swap Proxy Assets will not have the simple interpretation of the price of the Up Proxy Asset of the previous example, but the assets will have the offsetting advantage that they offer effective means of diversifying risk.

One way of defining the Complete Sets for the purpose of issuance and redemption is that all pairs of investments, one share in ij and one in ji, are Complete Sets. In this case, we can use the same dividend rule as was defined in the previous example, the example of Up-Down Proxy Assets. There are other possible ways to define Complete Sets. A Complete Set could consist of a share in ij a share in jk and a share in ki Proxy Assets.

These sets are circles of assets. If we defined such alternative Complete Sets, then we may wish to alter the Dividend Payout Formula so that, in the case where some balances are negative, so that some Swap Proxy Assets are paying no dividend, the dividends on the remaining Swap Proxy Assets still sum to the payout rate times the combined balances.

Figure 1A:
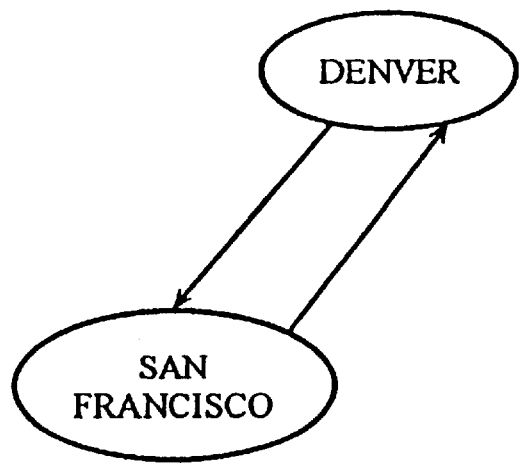
FIG. 1 is a block diagram illustrating examples of closed paths the data processor of the present invention may identify.
Figure 1B:
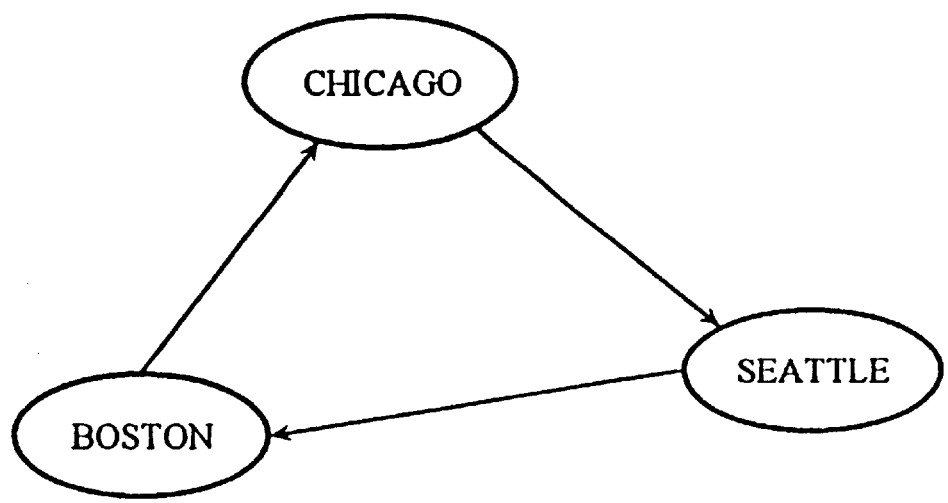

FIG. 1 shows an illustration of the kinds of closed paths (Complete Sets) that the Swap System Processor identifies among the orders to buy and sell shares. The first set, set A, is just a San Francisco-Denver Swap Proxy Asset paired with a Denver-San Francisco Swap Proxy Asset. The second set, set B, is a complicated closed path involving three cities and three Swap Proxy Assets.

The Proxy Asset Data Processor applies these more complicated definitions of Complete Sets and searches the data to find opportunities to issue, redeem, and allow trade of Proxy Assets, a process much more complicated than was the case with the Up-Down Proxy Assets. For example, setting the average Cash Account balance in the system ($V_t/S_t$) at $105.50 dollars per share, suppose that three book windows on the trading display screen are as shown:

| Bid | Quantity | Offer | Quantity |
|---|---|---|---|
| | Boston/Chicago Base 19980101 | | |
| 11015 | 100 | 11015 | 50 |
| 11014 | 50 | 11016 | 50 |
| 11013 | 50 | 11018 | 100 |
| | 1999/03/02 10:53 | | |
| | Chicago/Seattle Base 19980101 | | |
| 8593 | 50 | 8594 | 50 |
| | 1999/03/02 10:53 | | |
| | Seattle/Boston Base 19980101 | | |
| 12042 | 50 | 12043 | 50 |
| | | 12045 | 50 |
| | | 12046 | 100 |
| | 1999/03/02 10:53 | | |

The Proxy Asset System and Processor would discover that a bid for 50 Boston-Chicago shares at $110.15 matches with the offer to sell 50 Boston-Chicago shares, and so this trade would automatically be executed, and the match shown on the hypothetical window above would not persist for more than an instant. To execute these orders, there is no need for issuance or redemption. The computer will also discover that there is a bid for Boston-Chicago for another 50 shares at $110.15, a bid for 50 Chicago-Seattle shares at $85.93. and a bid for 50 Seattle-Boston shares for $120.42, and that the sum of these prices is $316.50, or three times the average Cash Account value per share ($3V_t/S_t$), and so it automatically fills these orders by issuing the new Proxy Assets, and allocating the proceeds from the sale into the respective Cash Accounts in proportion to amounts already there. Once again, these orders would not persist on the book window for more than an instant.

Note that in interfacing with an electronic trading system, such as the Globex or other system, there would ideally be some minor modifications in the electronic trading system. For an obvious example, traders would probably appreciate the ability to maintain more than one book window on the screen at a time, because of the interaction of orders within complete sets. For another example, traders who have asked the trading system to alert them when the price has hit a specific level may also want to be alerted in case any combination of orders for other Proxy Assets within the same Compete Set would suggest an opportunity to obtain the specified price by issuance or redemption at the specified price. It would be natural for our System to do this alerting, since such an operation would combine naturally with the enterprise of searching for Complete Sets among the orders.

These Swap Proxy Assets will work very well for those investors who already hold both real estate and other investments, but whose real estate investment is largely accounted for by their own homes, which are too concentrated in each city. For example, a person who owns a $400,000 home in Los Angeles and is worried about possible poor performance of real estate in Los Angeles relative to New York can invest $100,000 in Proxy Asset shares like those described just above that is short Los Angeles and long New York, and thereby create a situation in which he or she is effectively invested in the Los Angeles Market only in the amount of $200,000, and is effectively invested in the New York market in the amount of $200,000, thereby diversifying risks equally between the two cities. The person could also invest $40,000 in each of four swaps, a New-York-Los Angeles Swap Proxy Asset, a Miami-Los Angeles Swap Proxy Asset, and a Chicago-Los-Angeles Swap Proxy Asset, a Denver-Los Angeles Swap Proxy Asset, thereby diversifying from an exclusive Los Angeles real estate position to a real estate position that is equally diversified across five cities.

The Swap Proxy Assets are optionally bundled together and sold only as a group (called here a Proxy Asset Bundle). For example, if there is a lot of demand among residents of each city to swap their city real estate index for an average of all other cities, thereby effecting a diversified investment, then the only assets that need be marketed are the bundles of swaps that respond positively to a single city. Under certain conditions, these Proxy Asset Bundles will provide the underlying swaps to the public which then may be disassembled later if demand appears for the individual components of the bundles.

If there is a lot of demand among investors to invest in how well each city's real estate index will perform relative to all of the others combined, the relevant assets are the Proxy Asset Bundles of Swap Proxy Assets of each city versus all of the others. In this case, Complete Sets with only two elements would not exist; Complete Sets would require representation of all cities. Such structures permit investors to go long the chosen city while requiring no one to hedge any city. Such a structure could be of value if the demand for hedging is minimal.

EXAMPLE III

Multi-Asset Pooling Proxy Assets

A third form of Proxy Asset is labeled here as Multi-Asset Pools. This arrangement has no down securities, only up securities, the up securities for a given illiquid asset functioning also as down securities for the others together. Here. N proxy assets, each, corresponding to an index $I_{at}$, $\alpha=1, \ldots, N$, at time t, swaps the one index against the remaining N−1 indices. A Complete Set is one of each of the N Proxy Assets. The Cash Account Function that defines the balance per share after transfer in cash account a at time t may be given by:

$$balance_{at} = V_t/S_t + I_{at} - \sum_{\alpha \neq a} I_{\alpha t}/(N-1) \quad a = 1, \ldots, N$$

For example, if N=2, then the assets are analogous to swaps between pairs of assets, as with the Swap Proxy Assets described above. For another example, if N=5, there could be five Proxy Assets, one for the real estate of each of the five largest cities of the country. Note that this formula satisfies the adding-up constraint; the total value of all accounts after transfers still equals the total amount in all accounts before transfer.

Another Cash Account Formula that would define the balance in the Cash Account a at time t with a nonlinear formula:

$$balance_{at} = V_t/S_t \frac{N w_a INDEX_{at}}{\sum_{\alpha=1}^{N} w_\alpha INDEX_{\alpha t}} \quad a = 1, \ldots, N$$

where the weights $w_a$, $a=1, \ldots, N$ correspond to the relative amounts outstanding of the various assets. (For example, cities with more people in them would get more weight.) A Complete Set is again one of each of the N Proxy Assets.

With such a formula, the individual proxy asset Cash Accounts would never hit zero. Note that this formula also satisfies the adding-up constraint; the total value of all Cash Accounts after transfers still equals the total amount in all Cash Accounts before transfer. The amounts in the various accounts would always correspond to the values in the various illiquid assets. Thus, there will be less of a need to issue securities with a new base year as time goes on. This Multi-Asset Pooling Proxy Asset security will tend to be less volatile than the one defined by the linear formula.

Figure 2:
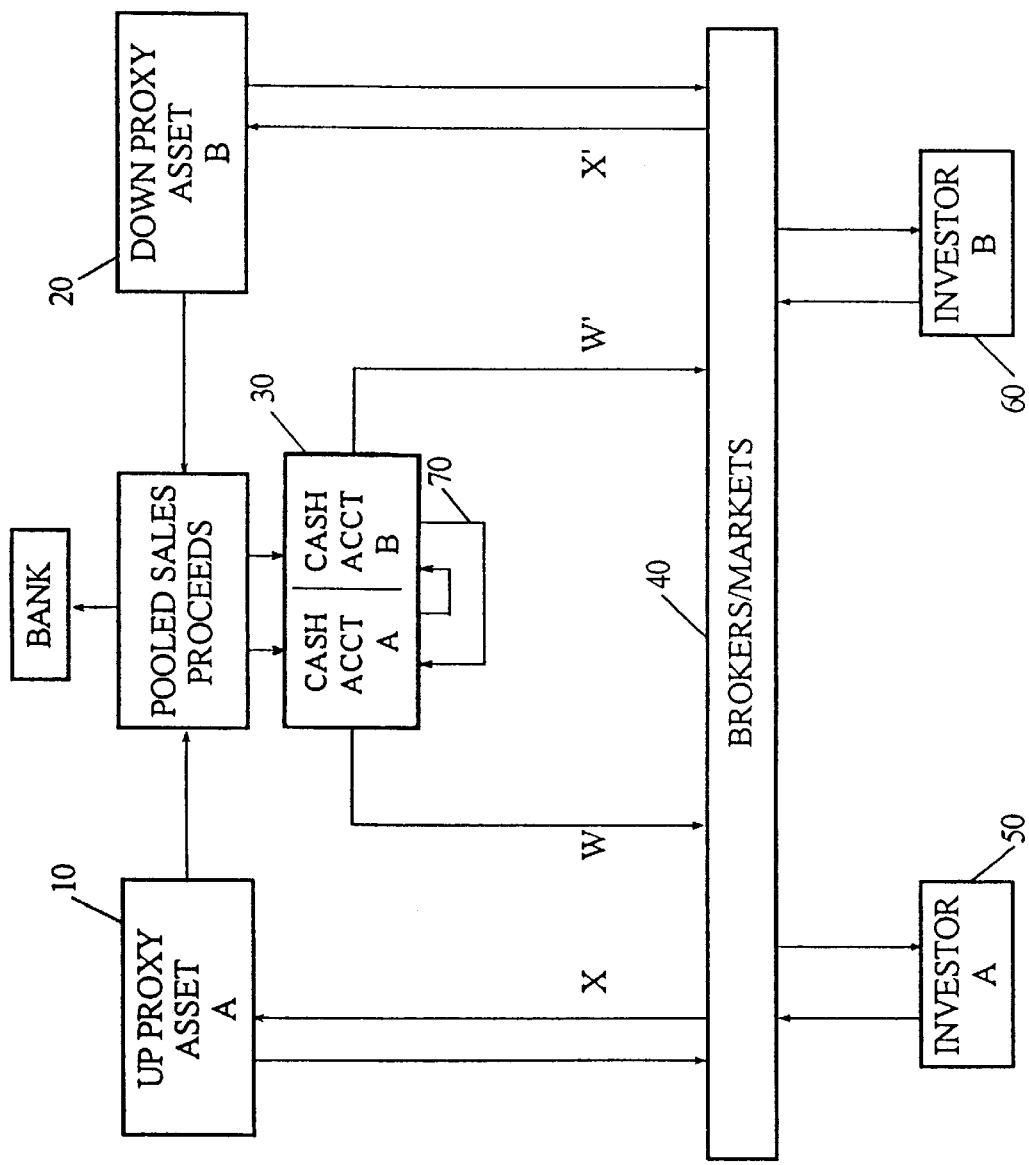
FIG. 2 is a relational block diagram depicting the Proxy Asset Account Manager.

With the foregoing description in mind, attention is now directed to FIG. 2 providing a schematic block diagram of the Proxy Asset Account Manager in the Up-Down Proxy Asset version. In this exemplary arrangement, two Proxy Assets are created, and the two constitute a Complete Set.

In particular, the System Proprietor issues shares of Up Proxy Asset (A) (block 10), following orders placed in the system on behalf of investors by conventional brokerage arrangements (block 40). Similarly, the System Proprietor also issues, at block 20, the Down Proxy Assets (B), also, following orders placed in the system by brokers on behalf of investors. Importantly, the shares must be issued only in Complete Sets, which in this example means that the number of A Proxy Assets issued must equal the number of B Proxy Assets issued. Receipts from the sale of both the UP and the Down securities are pooled by the System Proprietor in the Bank and then the individual Cash Accounts credited with shares of this pool, block 30, in proportions to the amounts per share already in these accounts.

As provided above, it can be recognized that no actual underlying illiquid asset has been identified or purchased by the System Proprietor, and accordingly, no meaningful transaction expenses have been incurred. The system operates to provide a proxy to real estate. The Up Proxy Assets are marketed with a set of defining parameters including a link to an established index, and the Cash Account, ACCT A tied to these account balance would grow in proportion with the index. In a reciprocal manner, the Down Proxy Asset's Cash Account balance would drop in value in proportion to an increase in the real estate index value. This is practically implemented by having actual capital taken from ACCT B and deposited in ACCT A in correspondence with the changing index value, as shown at 70. ACCT A would grow and ACCT B would shrink by a like amount. As the underlying index is capable of both growth and retraction, FIG. 2 depicts capital flows in both directions.

In accordance with stored program logic, the system receives input on adjusted account balances and determines a dividend payment, W corresponding to this new balance. An inverted relation is found between the index and the dividend stream of ACCT B, linked to the down securities. As real estate markets appreciate, funds in ACCT B are transferred out, leaving less capital for dividend generation W', and thus a reduced dividend for the holders of the Down Proxy Assets B. These Proxy Assets, however, should remain in demand at some price, because of the Cash Account value and because of their usefulness as a hedging vehicle against a drop in real estate values.

Implementation of the foregoing features is best accomplished via digital computer utilizing a uniquely defined controlling logic, wherein the computer system includes an integrated network between and among the various participants in the Proxy Asset security. This is depicted generally in FIG. 3, wherein a block diagram highlights the components of a computer system useful for implementing these assets. The computer system is of conventional design, having a central processor (CPU) block 100 linked to a main database, DB(I), block 110. The main database includes archival data on the various securities, and allows proper manipulation of the underlying parameters in accordance with system logic. The database structure is outlined in detail in the Database Structure section below. The logic controlling system operation is stored in discrete memory block 120.

One aspect of the foregoing system involves the input of price or income indices in the underlying illiquid asset markets, recording price movements and/or income changes necessary to implement changes in Proxy Asset accounts. Accordingly, the system includes commlink, block 140, to a network for proper controlled communication to various institutions and investors involved in the Proxy Asset. These participants have separate workstations, 150 located at remote locations, but in communication with the system. It is expected that the BANK and the price and income index provider(s) as well as the brokers handling trades with individuals, and possibly also individuals themselves, will each communicate with the System Proprietor.

The actual hardware configuration used is not particularly critical, as long as the processing power is adequate in terms of memory, accounts, periods of updating indexed values, the number of Proxy Assets and their respective Cash Account Formulas and Dividend Payout Formulas, and order execution, redemption and issuance. A network of PCs with a windows NT operating system is expected to give acceptable performance. Oracle based database engines allow substantial account coverage and expansion. The controlling logic will invariably use a language and compiler to match that on the CPU 100. These selections will be set according to per se well known conventions in the software community.

An alternative configuration would involve, instead of the 150 workstation linked by Windows NT, an internet web site that allows trade directly over the internet. Use of the system could still be restricted to brokers, if that is the objective, by suitable password procedures.

Table 1 below shows an exemplary arrangement of the database for the Proxy Asset Data Processor. This table shows the records and fields that will be necessary for proper management under this embodiment.

TABLE 1

DATABASE STRUCTURE

Format:
Records
Fields

Shareholder Information:
Customer or Client I.D. Number:
Name or firm:
Address:
Proxy Asset or Bundle ID Numbers*:
Current Numbers of Shares or Bundles Owned in Each*:
Transaction ID Numbers*:

Transaction Information:
Transaction ID Number:
Proxy Asset or Bundle ID Number:
Buyer ID Number:
Seller ID Number:
Exchange, Issuance or Redemption:
Date and Time:
Number of Shares or Bundles:
Price per Share or Bundle:
Complete Set ID Number:

TABLE 1-continued

DATABASE STRUCTURE

Buy and Sell Orders:
Order Number:
Customer ID Number:
Buy Order or Sell Order:
Proxy Asset ID Number or Bundle ID Number:
If Market Order: Numbers of Shares or Bundles
If Limit Order: Price and Numbers of Shares or Bundles
If Stop Order: Price and Numbers of Shares or Bundles
Order Date and Time*:
Order Expiration Date and Time: e.g. fill order until 1:00 pm 1/5/98

Pooled Cash Account Information:
Total Investable Assets Held for Cash Accounts (in Bank) ($V_1$):
Total Number of Shares Outstanding in Entire System ($S_1$):
Average Cash Account Balance per Share in System ($V_1/S_1$):

Complete Sets:
Set Number:
Proxy Asset or Bundle ID Numbers in Set*:
Index Information:
Index ID Number:
Update Frequency: e.g. quarterly
Date of Last Update:
Market Description: e.g. single family homes in Metro Los Angeles
Price or Income Index: e.g. price
Date*: e.g. First Quarter 1980
Index Level*: e.g. 100.00

Cash Account Formula:
Cash Account Formula ID Number:
Proxy Asset Type: Swap, Up or Down, etc.:
Cash Account Formula: e.g.,
a) for up Cash Account = index (index ID number)
b) for down Cash Account = $2 \times V_1/S_1$ - index (index ID number)
c) for swap Cash Account = $V_1/S_1 + 2 \times$ (A Index − B Index) (index ID numbers)

Dividend Payout Formula:
Dividend Payout Formula ID Number:
Proxy Asset Type: Swap, Up or Down, etc.:
Dividend Payout Dates*:
Dividend Payout Formula: e.g.,
dividend paid per share = $0.02 \times$ (Cash Account balance)

Proxy Asset Balance Change Information:
Proxy Asset Cash Balance Change Formula ID:
Proxy Asset ID Number:
Index ID Number*:
Cash Account Formula ID Number:
Cash Balance Change Frequency: e.g. quarterly
Next Cash Balance Change Date:

Historical Cash Balance Changes:
Historical Cash Balance Change ID Number
Historical Cash Balance Change Date*:
Historical Cash Balance Before Change Amount*:
Historical Cash Balance Change Amount*:
Historical Cash Balance After Change Amount*:

Proxy Asset Definition
Proxy Asset ID Number
Proxy Asset Type: Swap, Up or Down:
Initial Cash per Share: e.g. $100.00
Base Date: e.g. Jan. 10, 1998
Current Number of Shares Outstanding: e.g. 500,000
Current Cash Account Balance per share: e.g. $100
Dividend Frequency:
Next Dividend Due: e.g. Jan. 10, 1998
Cash Account Formula ID Number:
Dividend Payout Formula ID Number:
Next Cash Balance Change Due: e.g. Jan. 10, 1998
Cash Account Number:
Next Interest Deposit Due:
Issuance ID*:
Redemption ID*:

Proxy Asset Bundle Definition:
Proxy Asset Bundle ID:
Proxy Asset ID Numbers*:
Number of Shares of Each Proxy Asset in Bundle*:

Issuance History:
Proxy Asset or Bundle ID Number:
Complete Set ID Number:
Issuance ID Number:
Issuance Date:
Number of Shares:
Issuance Amount per Share:

Redemption History:
Proxy Asset or Bundle ID Number:
Complete Set ID Number:
Redemption ID Number:
Redemption Date:
Number of Shares:
Redemption Amount per Share:

*May be a multiple field

There are three primary functions of the logic command instructions. The first is to allow controlled creation of Proxy Assets, by defining new Proxy Assets from scratch, by bundling existing Proxy Assets together, by debundling existing Proxy Asset Bundles, or by doing combinations of the above. The second is to transfer balances among Cash Accounts so that the Cash Account Formula is satisfied by the balances. The third is to define and allocate dividends on the Proxy Assets. In each case, the critical controlling data must be stored in the properly configured database.

The first of these three functions is important, as success in risk management requires identifying the appropriate risk categories, categories that may be changing all the time. For example, investor demand for Proxy Assets in real estate may suddenly shift to a small configuration of neighborhoods that might be represented by a combination of zip-code or census-tract real estate price indices. We want to have a system in which the creation of new Proxy Assets such as these can be done as automatically as possible, by a trained representative of the System Proprietor operating the Proxy Asset Data Processor, or even, possibly, by broker clients themselves. If the cost of creating new Proxy Assets is made very low, then we might expect to see many more such Proxy Assets created.

The first function is accomplished in accordance with the logic flow chart depicted in FIG. 4. Logic conceptually begins at start block 200 and continues to block 210 wherein the Proxy Asset under consideration AST(I) is entered by the system user. By AST(I) we mean, for the real estate example, a definition of the geographical area, identification of real estate price index, base year, Cash Account Formula, and Dividend Payout Formula. Since users will find it difficult to specify these, the system may provide tools, such as maps showing locations of zip codes or census tracts, and some summary statistics about the price indices for each of these.

The system first tests whether the entered Proxy Asset definition AST(I) is new and cannot be approximated by existing Proxy Assets, by an identical Proxy Asset already defined, by Proxy Assets with a slightly different base year, by new bundles of existing Proxy Assets, by components of existing Proxy Asset Bundles, or by combinations thereof. In an initial run, test 220, the system searches over the existing Proxy Assets, the possibilities for new Proxy Asset Bundles from existing Proxy Assets, components of existing Proxy Asset Bundles, and displays the characteristics of the Proxy Assets that may be thus generated, including information about the Cash Account balance that would be implied for the Proxy Asset under consideration. Possibly, some combination or division of Proxy Assets with a slightly different base year may be close enough to the proposed Proxy Asset. If the user signals that the entered Proxy Asset is not sufficiently new, if one of the possibilities put forward by the Data Processor is satisfactory, logic branches to block 230 and the existing records are pulled from the database for the already extant Proxy Asset or Proxy Asset Bundles, with logic shifted to a separate subroutine.

A positive response to test 220 branches logic to block 250 wherein the parameters of the new Proxy Asset are entered into the system, and the parameters of the remaining elements of the Complete Set specified. In the case of simple Up-Down Proxy Assets, as illustrated in the Figure, the Complete Set can be automatically defined by the system, providing a definition of the Proxy Asset pair (AST_PAR (I)), both elements of which must now be created. At this point, it must be decided whether the new Proxy Asset pair should be defined in terms of a single index or whether the pair should be defined as a Proxy Asset Bundle in terms of a cluster of component indices. If the former, the system branches to block, 290. If the latter, the system branches to block 270 where the bundle is defined, possibly by entering new indices into the system, and updating the database, block 280.

At test 310, the system queries about a default cycle for the asset adjustment period. A negative response to this allows custom entry of a controlling cycle. CYC(I) setting the time interval between adjustments for the accounts and dividends for the Up-Down Proxy Assets. The more common response to test 310 defaults the controlling interval to a system stored value, blocks 320–330. This completes the first portion of the processing with logic shifted to the next sequence, block 350.

Creation of the underlying Cash Accounts and associated computer files and displays forming the foundation for the UP-Down Proxy Asset pair is accomplished by the logic control commands shown in FIG. 5. Beginning at start block 1400, logic first enables the entry of the pending Proxy Asset pair, AST_PAR(I) block 1410. The system checks whether this is a new Proxy Asset pair at test 1420. If new, logic continues to block 1440, wherein the Cash Account balance per share AST_BAL(I) is entered for both elements of the pair. These balances provide the financial backbone of the Proxy Assets. Implementation is made at blocks 1450–1460 setting up the two corresponding accounts ACCTA(I) and ACCTB(I): operation allows the entry of custom account parameters ("yes" to test 1470—and entry at block 1490) or entry of pre-selected default values, block 1480.

As previously described, the system includes a communication link between various participants and governing institutions. A book window is created, block 1500, for traders on the trading system, indicating, initially, the defined Cash Account balances per share for both Proxy Assets in the pair, even though no shares yet exist. Orders may now be placed by customers, and these will appear on the book window. To create the first Proxy Asset share, since no shares yet exist, the trading system must first identify a Complete Set within the orders whose value equals (or exceeds) the combined Cash Account balances per share. Thereafter, the system can fill orders both by exchanging existing shares and by finding Complete Sets among orders. When a Complete Set is first created, the Bank or similar repository of capital in account form, must be notified with wire transfer of funds and automatic structuring of accounts particularized in advance, in response to the order. During routine operation of the Proxy Asset System, the System Proprietor will be directly responsible for rebalancing the accounts (maintained by the Bank in pooled form only) within Complete Sets with the changing indices governing the accounts.

Returning to FIG. 5, after the database is updated with the current (and new) AST(I) information, logic queries on the next AST value (I+1) at test 1530; if another batch is ready, logic continues to the beginning and the process is repeated for the next in series.

Day to day operation of the system requires analysis of a variety of time-varying inputs and selective calculation of a number of distinct variables to allow operation of the Proxy Asset. In FIG. 6, several of these operations and routine procedures are depicted as examples of system processing, recognizing that many other variables are tracked in like fashion.

Beginning with block 1600, logic in FIG. 6 first pulls the current date, date(J), and enters this into the process, block 1610. The current Proxy Asset pair file is recalled, block 1620 read, which includes the current asset balances updated for interest earned by the Bank. The periodic date is compared to the present date to determine if the current date is an event date for adjusting the Proxy Asset accounts. A positive response to test 1630 reflects the match of dates and need to update the accounts; accordingly logic continues to block 1640 and the system recalls the current index value for the tracked asset, IDX(I.J). In this context, the counter variable J tracks the cycle—and thus absolute and relative time periods.

Continuing with FIG. 6, the system applies the Cash Account Formula to the Down Proxy Asset, block 1650, making the balance per share equal the combined balances per share in the two accounts before the transfer minus the index, and applies the Cash Account Formula to the Up Proxy Asset, block 1660, making the balance per share just equal to the index. Note that the combined balances of the two accounts is unchanged by this transfer, so the transfer is always feasible, even though the Down Proxy Asset Cash Account balance may be negative. Then the foregoing calculations are applied to calculate the appropriate dividend level per share for each Proxy Asset pair, using the Dividend Payout Formula. In block 1670, the system queries whether the balance in the Down Proxy Asset is negative. If No, the system proceeds to blocks 1680 and 1690, where each account is given a dividend at the rate DR(I). If Yes, then the system branches to block 1700, where the Up Proxy Asset is defined a dividend equal to DR(I) times the combined values in the two accounts, and block 1710, where the Down Proxy Asset is given a dividend of 0. These values are then stored in the main database, DB(x) at block 1720, and the entire process repeated for the next Proxy Asset under management by incrementing index variable I, block 1730.

As previously described, the system includes a communications link between various participants and governing institutions. This includes a Bank or similar repository of capital in account form, with wire transfer of funds and automatic structuring of accounts particularized in advance, and individual brokers or even individual investors who might place orders directly with the system. During routine operation of the proxy management system, the Bank will be directly responsible for investing the pooled balances of the Cash Accounts, while the Proxy Asset System will be responsible for maintaining the Cash Accounts for the individual Proxy Assets, thereby in effect dividing up the balance in the Bank among Proxy Asset shareholders.

Execution of orders, by issuance and redemption or matching and clearing of buy and sell orders, for the Proxy Assets is accomplished by the logic and control commands detailed in FIGS. 7 and 8. FIG. 7 shows the Proxy Asset Order Processor. Beginning at start block 400 in FIG. 7, the order entry subroutine is detailed. Orders are received at block 410 from investors or brokers via workstations 150 (FIG. 3) or internet link. Orders may consist of market orders (to buy or sell a specific number of a specific Proxy Asset at any price) or limit orders (to buy a specific number of Proxy Assets at or below a certain price, or to sell a specific number of Proxy Assets at or above a certain price, bids and offers, hits and takes), or possibly other kinds of orders. These buy and sell orders are stored, at block 420, in a pending order list for each Proxy Asset in what is essentially equivalent to a book window in the trading system. They may be arranged, in effect, in the book window with the highest bid at the top of one column, and the highest offer at the top of another column, with prices in descending value below these.

With reference to FIG. 8, the Proxy Asset Trading, Issuance and Redemption System begins at block 500. In a subroutine beginning at block 510, the pending order lists corresponding to each Proxy Asset are individually accessed and searched. At block 520, if a buy order for a Proxy Asset is matched with an identical sell order for that Proxy Asset, those shares are traded at block 530 without the issuance or redemption of any additional shares, those orders removed from the pending order list and processing returns to block 520 to search for additional matching orders. When no additional matches are present in the pending order list for the current Proxy Asset, the NO path from block 520 is followed-and processing loops, asset in the system;

When all matching orders in the system have been processed, logic extends to block 550, whereupon the buy orders for all Proxy Assets in the system are together searched for a Complete Set or closed path. As discussed in Example I, a Complete Set is just an Up-Down pair. In Example II above, closed paths may consist of reciprocal Swap Proxy Assets (e.g., ij and ji) or a more complicated set, such as an ij swap, a jk swap, and a ki swap (or any other path beginning and ending on the same asset). The combination of the Proxy Assets in the path have a total value as discussed in Example II. The sum of the buy orders in the path must equal or exceed this value. If so, test block 560 branches to a processing routine, beginning at block 570, for issuing new shares of these Proxy Assets, updating the Cash Accounts of the respective Proxy Assets in the proportion to amounts already there, then deletes these buy orders from the pending order list, before returning to loop 550 to search for additional closed paths. Alternately, if the sum of the buy orders in the identified path do not meet the total value of the path, the path identified in block 550 is rejected at test 560 and different path combinations are searched.

When no additional Complete Sets (closed paths) are located in subroutine 500, processing continues to a subroutine beginning at block 600, searching for closed paths of sell orders in the pending order lists of all Proxy Assets in the system. The sum of the sell orders is compared to the total value of the Proxy Assets in the identified path at block 610. If greater, the orders are executed beginning with block 620 by redeeming existing shares of these Proxy Assets, updating the Cash Accounts to reflect the redeemed Proxy Assets and deleting the sell orders from the pending order list. Processing then continues to exhaust all possible closed paths. When all closed paths are identified, the subroutine ends at block 630, or alternately, the abilities of one skilled in the art of programming may allow the System Proprietor to implement the subroutines instead beginning at blocks 510, 550 and 600 as separate, and/or concurrent subroutines.

The execution of the buy and sell orders may also be connected to procedures whereby trade is suspended in unusual market situations, akin to the circuit breakers of organized exchanges. The execution of the buy and sell orders may be limited to certain classes of customers, such as registered broker dealers. The execution of the buy and sell orders may also be connected to a market surveillance system, like those at existing exchanges, to check for attempts at market manipulation or other illegal trading practices.

FIG. 9 is a relational block diagram depicting the Proxy Asset Bundle Manager. In this diagram, four Proxy Assets, Proxy Assets A, B, C, and D are shown for illustration. In this example, only Proxy Asset D is sold directly to the public. Proxy Assets A, B, and C are bundled together as shown, and the bundle is sold to the public. Since the Cash Accounts for Proxy Assets A, B, and C are already in place, and their Cash Account Formulas and Dividend Payout Formulas already defined, people will have some idea of the effects of taking this Proxy Asset Bundle apart at a later date. Knowing that the Proxy Asset Bundle is decomposable later may facilitate its marketing to the public today.

Table 2 below shows an outline of the functions of the Proxy Asset Data Processor. The table gives an outline of the basic steps that this data processor must handle, on a continuing or daily basis, and the steps that are undertaken only on a less frequent basis.

TABLE 2

FUNCTIONS OF PROXY ASSET DATA PROCESSOR

1. Functions Ordered by System Proprietor
Add Index Data (run manually)
    Load new Index into Index Record Database
    Fill in other Fields of Index Record
Update Interest Payment (run daily)
For Each Proxy Asset:
    Is Interest Deposit Due Today?
    If Yes:
        Adjust Current Cash Balance with Interest Payment
        Fill in Next Interest Deposit Due
Pay Dividends (run daily)
For Each Proxy Asset:
    Interest Deposit Run for Today?
    If Yes:
        Dividend Payment Due Today?
        If Yes:
            Use Dividend Payout Formula to Calculate Dividend
            Pay Dividend, adjust Current Cash Account Balance
            Fill in Next Dividend Payment Due
Update Indices (run daily)
For each Index
Date for an Index Update?
    If Yes:
        Receive Index Update Into Index Record
Update Cash Account Balances Using Cash Account Formulas (run daily)
    Index, Interest and Dividend Update Performed Already for Today?
        If Yes
            For each Proxy Asset:
                Look up Cash Balance Change Formula and Necessary Indices
                Calculate Cash Account Balances Change
    Is Transfer Between Accounts due today?
        If yes:
            Make Transfers Among Cash Accounts according to Cash Account Formula
Define New Swap Proxy Asset (run manually)
    Select the Two Indices to be used, Rescale to 100 on Base Date
    Select Formula Type
    Fill in Base Date and Initial Cash Per Share

TABLE 2-continued

FUNCTIONS OF PROXY ASSET DATA PROCESSOR

Fill in Cash Account Formula
Fill in Dividend Payout Formula
Make List of all Complete Sets
Define New Up/Down Proxy Asset Pair (run manually)
    Select the Index to be Used, Rescale to 100 on Base Date
    Select Formula Type
    For both Up and Down Proxy Asset:
    Fill in Base Date and Initial Cash Per Share (same for both)
    Fill in Cash Account Formula
    Fill in Dividend Payout Formula
    Make List of All Complete Sets
2. Functions Ordered by Brokers
Process Buy Or Sell Orders (run when an order comes in)
(If for a Bundle, treat each Proxy Asset in Bundle as shown below)
Receive Transaction Request and Enter into Database
Display Order on Screen with Other Unfilled Orders
Display Historical Values of Indices
Display Cash Account Balances
Search for combinations of non-expired Buy and Sell Orders of same Proxy Asset
Identify Matches in Limit Orders and Numbers of Shares
        If found, Execute Orders through Exchange of Existing Shares
        If None Found,
        Combine Order with other Orders of same type (e.g. Buys for same Proxy Asset)
        If a Bid for Proxy Asset
            Search for Complete Set Among Bids
            If Total Bid Prices in Set $\geq$ Total Cash Account Balances
            Then:
                Issue New Shares
                Create Transaction Records
                Create Complete Set Record
                Fill in Issuance Records
                Create Investor Records
                Fill in Historical Cash Balance Changes Record
                Update Number of Shares and Current Cash Balance in Proxy Asset Record
        If an Offer to Sell a Proxy Asset
        Search for Complete Sets among Offers
        If Total Offer Prices in Set $\leq$ Total Cash Account Balances
        Then:
            Redeem Existing Shares
            Create Transaction Records
            Create Complete Set Record
            Fill in Redemption Records
            Update Investor Records
            Fill Historical Cash Balance Changes Record
            Update Number of Shares and Current Cash Balance in Proxy Asset Record
Provide Information for Electronic Trading System
    Order Processing and Confirmation
    Provide Information for Book Window for Trading Screen
    Provide Responses to Requests for Alerts - e. g., alert traders when a specified price level has been reached either by a trade in subject proxy asset or by trades in other proxy assets within the same complete set
3. Functions ordered by Investors (Informational Web Site):
View Indices
View Outstanding Limit Orders (Book Window)
View Composition of Bundles
View Proxy Asset
    Base Date
    Indices used
    Cash Account Balance per Share
    Starting Cash Account Balance per Share
    Cash Account Balance Change History
    Dividend Payment History
    Cash Account Formula
    Dividend Payout Formula Although the invention has been described in detail for the purpose of illustration, it is to be understood that such detail is solely for that purpose and that variations can be made therein by those skilled in the art without departing from the spirit and scope of the invention. Indeed, some variations may need to be made to satisfy requirements of regulators, tax authorities, existing exchanges, brokers and underwriters, requirements that may vary through time and across countries.

What is claimed is:

1. A method for providing a proxy asset set of two or more proxy assets that responds to a set of one or more indices, each proxy asset of the proxy assets set having a proxy asset account value and a number of proxy asset shares representing equal claims on the proxy asset account value, the proxy asset set having a total number of shares equal to a sum over all the number of proxy asset shares in the proxy assets set and having a proxy assets set account value equal to a sum over all the proxy asset account values of the proxy assets set, the method comprising:

defining a proxy asset account value with a predetermined account formula responsive to at least one corresponding index of the set of one or more indices;

constraining the proxy assets set account value by a value of a resources pool; and reevaluating the proxy asset account value according to the account formula upon occurrence of each event of a plurality of predetermined events.

2. The method of claim 1, further comprising:

initially assigning the total number of shares to a set of investors, each investor of the set of investors assigned at least one investor account, each investor account having an investor account number of proxy asset shares for one proxy asset of the proxy assets set; and initially receiving from each investor for each investor account a contribution to the resources pool in an amount equal to a product of the investor account number of proxy asset shares and an initial value for a proxy asset account value per share.

3. The method of claim 1, further comprising for a particular proxy asset of the proxy assets set, publishing an updated particular proxy asset account value per share substantially equal to a quotient of a reevaluated proxy asset account value of the particular proxy asset divided by the number of proxy asset shares of the particular proxy asset.

4. The method of claim 1, wherein, during the reevaluating step, substantially all value lost from the proxy asset account value of one proxy asset is given to the proxy asset account value of one or more other proxy assets of the proxy assets set.

5. The method of claim 1, said reevaluating comprising:

receiving a set of one or more updated index values corresponding to the set of one or more indices at an update time of a current event of the plurality of predetermined events;

receiving an updated value of the resources pool at the update time; and calculating an updated proxy asset account value for each proxy asset using the account formula and the updated value of the resources pool.

6. The method of claim 5, said reevaluating step further comprising:

calculating a payout amount from the resources pool according to a predetermined payout formula; and reducing the updated value of the resources pool by the payout amount, before said calculating the updated proxy asset account value.

7. The method of claim 6, further comprising publishing, for a particular proxy asset, a particular payout per share responsive to the payout amount and the total number of shares.

8. The method of claim 7, wherein the particular payout per share is further responsive to the proxy asset account value of the particular proxy asset and the proxy assets set account value.

9. The method of claim 7, wherein the particular payout per share is further responsive to a change in proxy asset account value of the particular proxy asset from a preceding value of the proxy asset account value at a preceding event of the plurality of predetermined events.

10. The method of claim 1, wherein:
a proxy asset account value per share substantially equals a quotient of the proxy asset account value divided by the number of proxy asset shares for a corresponding proxy asset;
the set of one or more indices is a set consisting of a single economic indicator,
the proxy assets set includes an up proxy asset and a down proxy asset; and
said defining a proxy asset account value step further includes
defining an up proxy asset account value with an up account formula wherein an up proxy asset account value per share is proportional to the single economic indicator for at least some values of the single economic indicator, and
defining a down proxy asset account value with a down account formula wherein the down asset account value substantially equals a difference between the value of the resources pool minus a product of the number proxy asset shares for the up proxy asset and the up proxy asset value per share.

11. The method of claim 1, wherein:
an average value per share substantially equals a quotient of the proxy assets set account value divided by the total number of shares;
a proxy asset account value per share substantially equals a quotient of the proxy asset account value divided by the number of proxy asset shares for a corresponding proxy asset;
the set of one or more indices contains a number N of independent indices, where N is greater than one;
the proxy assets set has exactly N proxy assets; and
said step of defining a proxy asset account value further includes, for a particular proxy asset of the proxy assets set, a particular account function for setting a particular proxy asset account value per share substantially equal to the average share value plus a difference between a particular index of the N independent indices and an average of all other indices of the N independent indices, said particular index corresponding to the particular proxy asset.

12. The method of claim 1, wherein:
an average value per share equals a quotient of the proxy assets set account value of the proxy assets set and the total number of shares of the proxy assets set;
a proxy asset account value per share equals a quotient of the proxy asset account value divided by the number of proxy asset shares for a corresponding proxy asset;
the set of one or more indices contains a number N of independent indices, where N is greater than one;
the proxy assets set has exactly N proxy assets; and
said step of defining a proxy asset account value further includes, for a particular proxy asset of the proxy assets set, a particular account function for setting a particular proxy asset account value per share substantially equal to the average value per share multiplied by a quotient of a corresponding particular index of the N indices divided by a sum of the N independent indices.

13. The method of claim 1, further comprising:
defining a particular proxy asset bundle comprising a share of a first proxy asset and a share of a second proxy asset; and
publishing a value of the particular proxy asset bundle.

14. The method of claim 13, wherein the first proxy asset is from the proxy assets set and the second proxy asset is from the proxy assets set.

15. The method of claim 13, wherein the first proxy asset is from a first proxy assets set and the second proxy asset is from a different proxy assets set.

16. The method of claim 1, wherein:
an average value per share equals a quotient of the proxy assets set account value of the proxy assets set and the total number of shares of the proxy assets set;
a complete set of shares satisfies certain conditions and has a complete set number of shares; and
the method further comprises at least one of issuing a complete set of shares and redeeming a complete set of shares.

17. The method of claim 16, wherein the certain conditions include for each particular proxy asset in the proxy assets set, maintaining a ratio of shares of the particular proxy asset in the complete set to the complete set number of shares substantially equal to a ratio of the number of proxy asset shares of the particular proxy asset to the total number of shares.

18. The method of claim 16, said issuing a complete set of shares comprising:
increasing the number of proxy asset shares of a particular proxy asset by a number of shares of the particular proxy asset in the complete set, for each particular proxy asset in the proxy assets set; and
increasing the resources pool with additional resources in an amount substantially equal to a product of the complete set number of shares multiplied by the average value per share.

19. The method of claim 16, said redeeming a complete set of shares comprising:
decreasing the number of proxy asset shares of a particular proxy asset by a number of shares of the particular proxy asset in the complete set, for each particular proxy asset in the proxy assets set; and
decreasing the resources pool by a payout of resources of an amount substantially equal to a product of the complete set number of shares multiplied by the average value per share.

20. The method of claim 1, wherein each different event of the plurality of predetermined events is a different update time of a set of predetermined times.

21. The method of claim 1, wherein at least one index of the set of one or more indices represents prices for a liquid asset.

22. The method of claim 1, wherein at least one index of the set of one or more indices represents prices for an illiquid asset.

23. The method of claim 22, wherein the illiquid asset comprises real estate.

24. The method of claim 22, wherein the illiquid asset comprises privately held corporate stocks.

25. The method of claim 22, wherein the illiquid asset comprises infrequently traded corporate stocks.

26. The method of claim 22, wherein the illiquid asset comprises a ship.

27. The method of claim 22, wherein the illiquid asset comprises an aircraft.

28. The method of claim 22, wherein the illiquid asset comprises a rare coin.

29. The method of claim 22, wherein the illiquid asset comprises a precious gemstone.

30. The method of claim 22, wherein the illiquid asset comprises a masterpiece painting.

31. The method of claim 22, wherein the illiquid asset comprises livestock.

32. The method of claim 22, wherein the illiquid asset comprises a thoroughbred.

33. The method of claim 1, wherein at least one index of the set of one or more indices represents an income flow.

34. The method of claim 33, wherein the income flow comprises income associated with a country.

35. The method of claim 33, wherein the income flow comprises income associated with an individual person.

36. The method of claim 33, wherein the income flow comprises income associated with human labor.

37. The method of claim 33, wherein the income flow comprises income due to human capital.

38. The method of claim 1, wherein at least one index of the set of one or more indices represents an economic indicator.

39. The method of claim 38, wherein the economic indicator comprises a consumer price index.

40. The method of claim 38, wherein the economic indicator comprises an unemployment rate.

41. The method of claim 38, wherein the economic indicator comprises consumer confidence.

42. The method of claim 1, wherein at least one index of the set of one or more indices represents a macro-economic indicator.

43. The method of claim 1, wherein at least one index of the set of one or more indices represents a composite index of corporate stocks.

44. The method of claim 1, wherein at least one index of the set of one or more indices represents an appreciation strip of the composite index of corporate stocks.

45. The method of claim 44, wherein another index of the set of one or more indices represents an appreciation strip residual of a composite index of corporate stocks.

46. The method of claim 1, wherein at least one index of the set of one or more indices represents earnings for at least one corporation.

47. The method of claim 1, wherein at least one index of the set of one or more indices represents earnings in a particular time period for a plurality of corporations.

48. The method of claim 1, wherein at least one index of the set of one or more indices represents price to earnings ratio for a corporate stock.

49. The method of claim 1, wherein at least one index of the set of one or more indices represents a tracking stock for a subdivision of a company.

50. The method of claim 1, wherein at least one index of the set of one or more indices represents an index of consumption.

51. The method of claim 1, wherein at least one index of the set of one or more indices represents a balance of trade for a country.

52. The method of claim 1, wherein at least one index of the set of one or more indices represents a balance of trade for a pair of countries.

53. The method of claim 1, wherein the resources pool includes illiquid assets.

54. The method of claim 1, wherein the resources pool includes income flows.

55. The method of claim 1, wherein the resources pool includes cash.

56. The method of claim 1, wherein the resources pool includes liquid assets.

57. The method of claim 1, wherein the resources pool includes an item with present value.

58. The method of claim 1, further comprising, trading a proxy asset on an exchange.

59. The method of claim 58, further comprising, identifying complete sets among orders for proxy assets of the proxy assets set on an exchange, wherein a complete set satisfies certain conditions.

60. The method of claim 59, further comprising, using predetermined order-filling rules to fill orders with at least one of trades among investors and redeeming shares in complete sets and issuing shares in complete sets.

61. The method of claim 1 further comprising defining termination rules for ending the proxy assets set and distributing all resources in the resources pool.

62. The method of claim 1, said step of defining a proxy asset account value further comprising:

receiving input from investors indicating one or more candidate indices from which the set of one or more indices is selected; and automatically building the predetermined account formula in response to the one or more candidate indices indicated.

63. The method of claim 1 wherein at least one index of the set of one or more indices represents a spread of different types of interest rates.

64. The method of claim 1 wherein at least one index of the set of one or more indices represents a spread of different types of mortgage rates.

65. The method of claim 1 wherein at least one index of the set of one or more indices represents a spread in a bid ask price for one or more items on an exchange.

66. The method of claim 1 wherein at least one index of the set of one or more indices represents an occupational income.

67. The method of claim 66 wherein the occupational income is associated with a class of labor.

68. The method of claim 66 wherein the occupational income is associated with a cluster of labor sharing certain characteristics.

69. A method for banking investments in proxy assets, the method comprising:

a. generating data indicative of a set of two or more proxy assets that respond to a set of one or more indices, each proxy asset of the proxy assets set having a proxy asset account value and a number of proxy asset shares;

b. maintaining a database having information indicative of a value for a resources pool substantially equaling a sum over the proxy asset set of all proxy asset account values; and c. maintaining a database having information indicative of a particular investor account, said information including:
i) a particular investor of a set of investors,
ii) a particular proxy asset of the proxy assets set, and
iii) an investor account number of proxy asset shares;

d. transmitting a signal indicative of the value of the resources pool; and e. receiving a proxy asset account value per share responsive to an index of the set of one or more indices for each proxy asset of the proxy assets set.

70. A method for trading on an exchange shares of proxy assets, said method comprising:

a. generating data indicative of a set of two or more proxy assets that respond to a set of one or more indices, each proxy asset of the proxy assets set having a proxy asset account value and a number of proxy asset shares, a sum over the proxy asset set of the proxy asset account value substantially equaling a value of a resources pool;

b. receiving data indicative of proxy asset shares;

c. presenting to a trader a complete set of said proxy asset shares; and d. trading said proxy asset shares among one or more offers to trade;

wherein a complete set of proxy asset shares satisfies a certain condition among shares of the proxy assets set.

71. The method of claim 70, said presenting a complete set further comprising maintaining more than one book windows on a trading screen at one time.

72. The method of claim 70 further comprising allowing a trader to set an alert responsive to an average price of a complete set of sell orders satisfying a proxy assets set redemption condition.

73. The method of claim 70 further comprising allowing a trader to set an alert responsive to an average price of a complete set of buy orders satisfying a proxy assets set issuance condition.

74. The method of claim 70 further comprising automatically finding a complete set of shares of the proxy assets set among one or more offers to trade.

75. The method of claim 70 further comprising automatically filling one or more orders to trade proxy assets of the proxy assets set according to predetermined order-filling rules.

76. A method for managing a proxy asset set of two or more proxy assets that respond to a set of one or more indices, each proxy asset of the proxy assets set having a proxy asset account value and a number of proxy asset shares representing equal claims on the proxy asset account value, the proxy asset set having a total number of shares equal to a sum over the proxy assets set of the number of proxy asset shares and having a proxy assets set account value equal to a sum over the proxy assets set of the proxy asset account value, the method comprising:

receiving a value of a resources pool;

receiving a value of an index of the set of indices;

evaluating a proxy asset account value according to an account formula responsive to the value of the index and a constraint on the proxy assets set account value by the value of the resources pool, said evaluating performed upon occurrence of each event of a plurality of predetermined events.

77. A system for providing a proxy asset set of two or more proxy assets that respond to a set of one or more indices, each proxy asset of the proxy assets set having a proxy asset account value and a number of proxy asset shares, the proxy asset set having a total number of shares equal to a sum over the proxy assets set of the number of proxy asset shares and having a proxy assets set account value equal to a sum over the proxy assets set of the proxy asset account value, the system comprising:

a network;

a computer readable medium connected to the network, said computer readable medium storing a value of a resources pool and a number of shares of each proxy asset for each investor of a set of investors;

one or more bank processors connected to the network configured to compute the value of the resources pool; and one or more proxy assets set processors configured for evaluating a proxy asset account value as a function of at least one corresponding index of the set of one or more indices, and for constraining the proxy assets set account value by the value of the resources pool.

78. An apparatus for banking investments in proxy assets, said apparatus comprising:

a. a generator for generating a set of two or more proxy assets that respond to a set of one or more indices, each proxy asset of the proxy assets set having a proxy asset account value and a number of proxy asset shares;

b. one or more computer readable medium for storing:
   i) information indicative of a value for a resources pool substantially equaling a sum over the proxy asset set of all proxy asset account values, and
   ii) information indicative of a particular investor account, said information including:
      a) a particular investor of a set of investors,
      b) a particular proxy asset of the proxy assets set, and
      c) an investor account number of proxy asset shares; and c. one or more processors connected to the computer readable medium and configured to:
   i) generate a signal indicative of the value of the resources pool; and
   ii) process a proxy asset account value per share responsive to an index of the set of one or more indices for each proxy asset of the proxy assets set.

79. An apparatus for trading on an exchange shares of proxy assets, said apparatus comprising:

a. a generator for generating data indicative of a set of two or more proxy assets that respond to a set of one or more indices, each proxy asset of the proxy assets set having a proxy asset account value and a number of proxy asset shares, a sum over the proxy asset set of the proxy asset account value substantially equaling a value of a resources pool;

b. a receiver configured to receive data indicative of proxy asset shares;

c. a display device; and d. one or more processors connected to the display device, the one or more processors configured to:
   i) present on the display device a complete set of shares of the proxy assets set; and
   ii) enable trading of said proxy asset shares among one or more offers to trade, wherein a complete set of proxy asset shares satisfies a certain condition among shares of the proxy assets set.

80. An apparatus for managing a proxy asset set of two or more proxy assets that respond to a set of one or more indices, each proxy asset of the proxy assets set having a proxy asset account value and a number of proxy asset shares representing equal claims on the proxy asset account value, the proxy asset set having a total number of shares equal to a sum over the proxy assets set of the number of proxy asset shares and having a proxy assets set account value equal to a sum over the proxy assets set of the proxy asset account value, the apparatus comprising:

a computer readable medium for storing a value of a resources pool and a value of an index of the set of indices; and one or more processors connected to the computer readable medium, the one or more processors configured to evaluate a proxy asset account value according to an account formula responsive to the value of the index and a constraint on the proxy assets set account value by the value of a resources pool, said evaluating performed upon occurrence of each event of a plurality of predetermined events.

81. A computer program product for banking investments in proxy assets, said computer program product comprising:
- a. data indicative of a set of two or more proxy assets that respond to a set of one or more indices, each proxy assets set having a proxy asset account value and a number of proxy asset shares;
- b. data stored on one or more computer readable medium comprising:
  - i) information indicative of a value for a resources pool substantially equaling a sum over the proxy asset set of all proxy asset account values, and
  - ii) information indicative of a particular investor account, said information including:
    - a) a particular investor of a set of investors,
    - b) a particular proxy asset of the proxy assets set, and
    - c) an investor account number of proxy asset shares; and
- c. instructions stored on the one or more computer readable medium, said instructions for causing one or more processors to:
  - i) generate a signal indicative of the value of the resources pool; and
  - ii) process a proxy asset account value per share responsive to an index of the set of one or more indices for each proxy asset of the proxy assets set.

82. A computer program product for trading on an exchange shares of proxy assets, said computer program product comprising:
- a. a computer readable medium having stored thereon data indicative set of two or more proxy assets that respond to a set of one or more indices, each proxy asset of the proxy assets set having a proxy asset account value and a number of proxy asset shares, a sum over the proxy asset set of the proxy asset account value substantially equaling a value of a resources pool;
- b. a computer readable medium having stored thereon data indicative of proxy asset shares, wherein said proxy asset shares represent claims on the proxy assets set;
- c. instructions stored on the computer readable medium for causing one or more processors to present on a display device a complete set of shares of the proxy assets set; and
- d. instructions stored on the computer readable medium for causing one or more processors to enable trading of said proxy assets shares among one or more offers to trade;

wherein a complete set of proxy asset shares satisfies a certain condition among shares of the proxy assets set.

83. A computer program product for managing a proxy asset set of two or more proxy assets that respond to a set of one or more indices, each proxy asset of the proxy assets set having a proxy asset account value and a number of proxy asset shares representing equal claims on the proxy asset account value, the proxy asset set having a total number of shares equal to a sum over the proxy assets set of the number of proxy asset shares and having a proxy assets set account value equal to a sum over the proxy assets set of the proxy asset account value, the computer program product comprising:

a computer readable medium for storing a value of a resources pool and a value of an index of the set of indices; and instructions stored on the computer readable medium causing one or more processors to evaluate a proxy asset account value according to an account formula responsive to the value of the index, and a constraint on the proxy assets set account value by the value of a resources pool, said evaluating performed upon occurrence of each event of a plurality of predetermined events.

84. A computer data signal embodied in a carrier wave and representing instructions for execution by a computer for banking investments in proxy assets, said computer data signal comprising:
- a. data indicative of a value for a resources pool;
- b. data indicative of a particular investor account including:
  - i) a particular investor of a set of investors,
  - ii) a particular proxy asset of the proxy assets set, and
  - iii) an investor account number of proxy asset shares; and
- c. computer instructions configured to cause one or more processors to:
  - i) generate data indicative of a proxy assets set of two or more proxy assets that respond to a set of one or more indices, a sum of account values of said proxy assets set substantially equaling the value of the resource pool;
  - ii) transmit a signal indicative of the value of the resources pool; and
  - iii) receive signals indicative of a proxy asset account value per share responsive to an index of the set of one or more indices for each proxy asset of the proxy assets set.

85. A computer data signal embodied in a carrier wave and representing instructions for execution by a computer for trading on an exchange shares of proxy assets, said computer data signal comprising:

computer instructions configured to cause one or more processors to:
- a) generate data indicative of a set of two or more proxy assets that respond to a set of one or more indices, each proxy asset of the proxy assets set having a proxy asset account value and a number of proxy asset shares;
- ii) present on a display device a complete set of shares of the proxy assets set; and
- iii) execute a trade of said proxy asset shares in response to one or more offers to trade shares of the proxy assets set;

wherein a complete set satisfies a certain condition among shares of the proxy assets set.

86. A computer data signal embodied in a carrier wave and representing instructions for execution by a computer for managing proxy assets set, the computer data signal comprising:
- a. data indicative of a value of a resources pool and a value of an index of a set of indices; and
- b. computer instructions configured to cause one or more processors to:
  - i) generate data indicative of a proxy assets set of two or more proxy assets that respond to the set of indices, a sum of account values of said proxy assets set substantially equaling the value of the resource pool; and
  - ii) evaluate a proxy asset account value in response to one or more of a plurality of predetermined events and according to an account formula responsive to the value of the index and a constraint on the proxy assets set account value by the value of a resources pool.

* * * * *